US009032471B2

(12) United States Patent
Hayashi et al.

(10) Patent No.: US 9,032,471 B2
(45) Date of Patent: May 12, 2015

(54) COMMUNICATION SYSTEM, TRANSMISSION APPARATUS, TRANSMISSION METHOD, RECEPTION APPARATUS AND RECEPTION METHOD

(71) Applicant: Sony Corporation, Tokyo (JP)

(72) Inventors: Toshihide Hayashi, Kanagawa (JP); Masayuki Tsumura, Tokyo (JP); Koki Tsumori, Tokyo (JP); Katsuhiro Shimizu, Tokyo (JP); Ban Kawamura, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/477,380

(22) Filed: Sep. 4, 2014

(65) Prior Publication Data

US 2014/0369662 A1    Dec. 18, 2014

Related U.S. Application Data

(63) Continuation of application No. 14/191,909, filed on Feb. 27, 2014, which is a continuation of application No. 13/652,942, filed on Oct. 16, 2012, now Pat. No. 8,789,127, which is a continuation of application No. 12/450,142, filed as application No. PCT/JP2007/071405 on Nov. 2, 2007, now Pat. No. 8,392,958.

(30) Foreign Application Priority Data

Mar. 13, 2007  (JP) ................ P2007-063327
May 11, 2007   (JP) ................ P2007-127415

(51) Int. Cl.
*H04N 7/16*    (2011.01)
*H04N 5/38*    (2006.01)
(Continued)

(52) U.S. Cl.
CPC ........... *H04N 5/38* (2013.01); *H04N 21/43635* (2013.01); *H04N 5/775* (2013.01)

(58) Field of Classification Search
USPC ......................... 725/133, 141, 153
See application file for complete search history.

(56) References Cited

U.S. PATENT DOCUMENTS 7,339,959 B2  3/2008  Nio et al.
7,414,670 B2  8/2008  Takamori et al.
(Continued)

FOREIGN PATENT DOCUMENTS

EP    0288890 A2    11/1988
EP    1624669 A2    2/2006
(Continued)

OTHER PUBLICATIONS

Supplementary European Search Report EP 07831139, dated Nov. 30, 2010.
(Continued)

*Primary Examiner* — Hunter B Lonsberry
(74) *Attorney, Agent, or Firm* — Lerner, David, Littenberg, Krumholz & Mentlik, LLP

(57) ABSTRACT

An AV system composed of an HD recorder and a display unit uses a communication interface of the HDMI. An HDMI source of the HD recorder transmits image data (image signal) in the form of differential signals to an HDMI sink of the display unit through three TMDS channels. The HDMI source inserts content identification information for the identification of the type of a content of image data to be transmitted into an AVI InfoFrame packet placed in a blanking period. A control section of the display unit controls operation of a display processing section which carries out a process for displaying for the image data based on the content identification information received by the HDMI sink and a display section for displaying an image.

4 Claims, 26 Drawing Sheets

(51) Int. Cl.
*H04N 21/4363* (2011.01)
*H04N 5/775* (2006.01)

(56) References Cited

U.S. PATENT DOCUMENTS

| | | |
|---|---|---|
| 7,580,081 B2 | 8/2009 | Tamano et al. |
| 8,789,127 B2 | 7/2014 | Hayashi et al. |
| 2005/0128349 A1 | 6/2005 | Takamori et al. |
| 2005/0259181 A1 | 11/2005 | Watanabe |
| 2005/0266924 A1 | 12/2005 | Horikoshi |
| 2006/0227064 A1 | 10/2006 | Tamano et al. |
| 2007/0011720 A1 | 1/2007 | Min |

FOREIGN PATENT DOCUMENTS

| | | |
|---|---|---|
| EP | 1624684 A2 | 2/2006 |
| JP | 06-133239 A | 5/1994 |
| JP | 2000-242212 A | 9/2000 |
| JP | 2002-158941 A | 5/2002 |
| JP | 2002-199359 A | 7/2002 |
| JP | 2004-349913 A | 12/2004 |
| JP | 2004-364010 A | 12/2004 |
| JP | 2005-142709 A | 6/2005 |
| JP | 2005-167895 A | 6/2005 |
| JP | 2005-333472 A | 12/2005 |
| JP | 2005-338605 A | 12/2005 |
| JP | 2006-098765 A | 4/2006 |
| JP | 2006-295377 A | 10/2006 |
| JP | 2006-319503 A | 11/2006 |
| JP | 2006-352599 A | 12/2006 |
| JP | 2007-020166 A | 1/2007 |
| JP | 2007006349 A | 1/2007 |
| JP | 2009518881 A | 5/2009 |
| KR | 1020070006471 | 1/2007 |
| WO | 2007008498 A2 | 1/2007 |

OTHER PUBLICATIONS

Communication from EP Application No. 07831139.6, dated Jul. 10, 2013.
Office Action from Korean Application No. 10-2009-7016846, dated Nov. 14, 2013.
European Search Report from EP Application No. 13181030, dated Oct. 4, 2013.
Office Action from Japanese Application No. 2009-503881, dated Dec. 3, 2013.
Office Action from Japanese Application No. 2009-503881, dated May 27, 2014.
Japanese Office Action for JP Application No. 2014027111, dated Feb. 24, 2015.
Hitachi Ltd., et al., High-Definitition Multimedia Interface, Specifcation Version 1.3a, Nov. 10, 2006.

F I G . 5
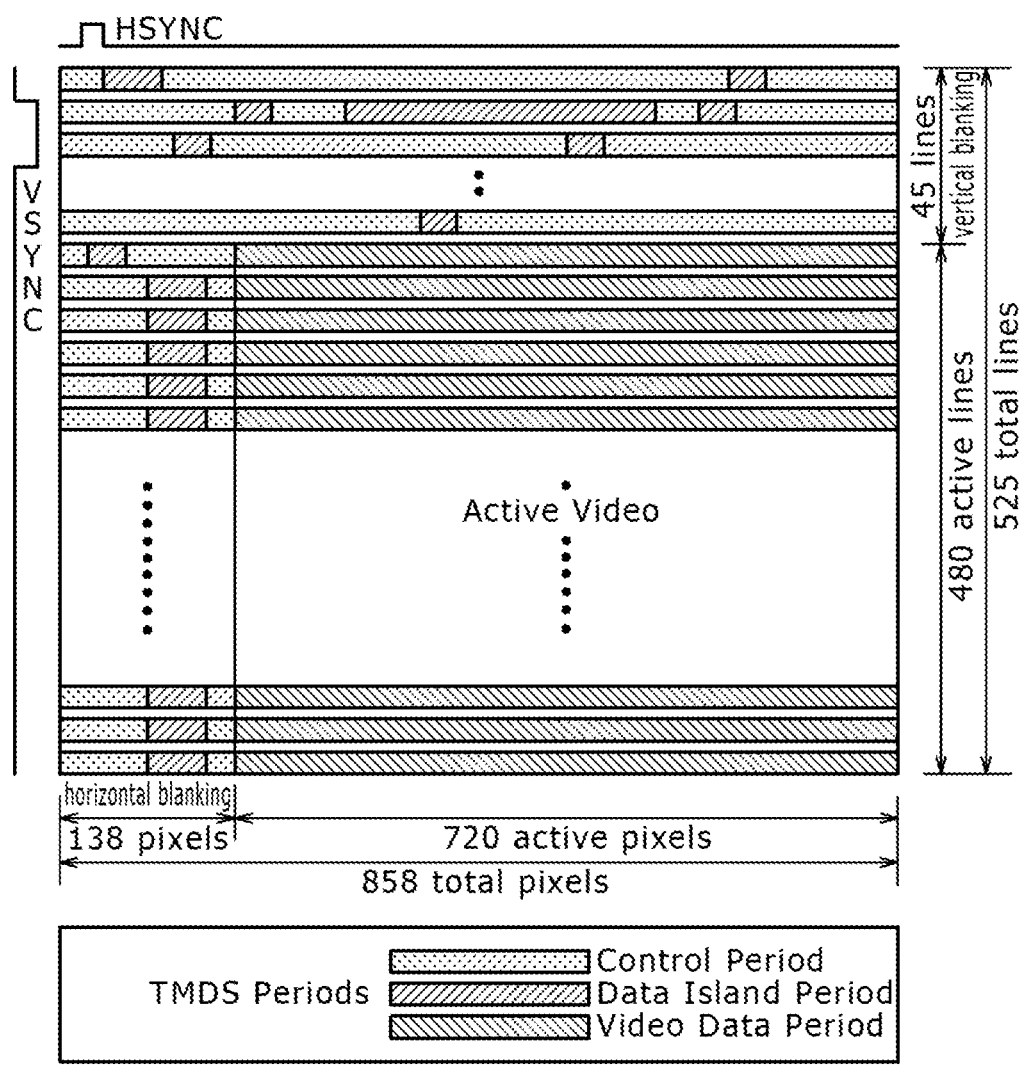

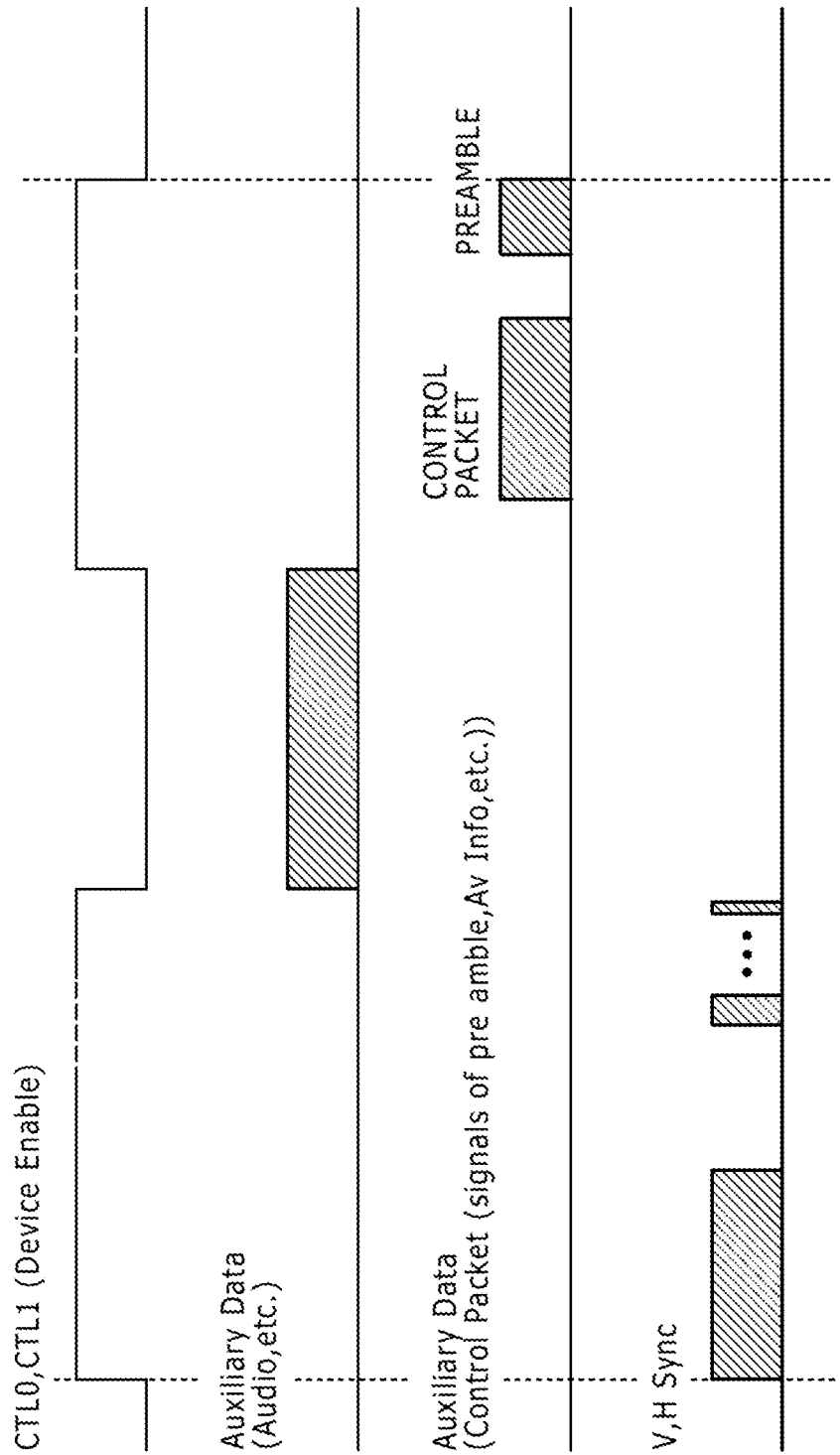

FIG. 7

| | | | | | | | |
|---|---|---|---|---|---|---|---|
| InfoFrame Type Code | | | InfoFrame Type = $02_{16}$ | | | | |
| InfoFrame Version Number | | | Version = $02_{16}$ | | | | |
| Length of AVI InfoFrame | | | Length of AVI InfoFrame (13) | | | | |
| Data Byte 1 | Rsvd(0) | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | Rsvd(0) | VIC6 | VIC5 | VIC4 | VIC3 | VIC2 | VIC1 | VIC0 |
| Data Byte 5 | CT1 | CT0 | Rsvd(0) | Rsvd(0) | PR3 | PR2 | PR1 | PR0 |
| Data Byte 6,7 | Line Number of End of Top Bar | | | | | | | |
| Data Byte 8,9 | Line Number of Start of Bottom Bar | | | | | | | |
| Data Byte 10,11 | Pixel Number of End of Left Bar | | | | | | | |
| Data Byte 12,13 | Pixel Number of Start of Right Bar | | | | | | | |
| Data Byte 14···27 | Reserved(0) | | | | | | | |

FIG.8

| CT1 | CT0 | IT Content Attribute |
|---|---|---|
| 0 | 0 | Text:generic IT content |
| 0 | 1 | Photograph:still pictures |
| 1 | 0 | Cinema:Movie or home video |
| 1 | 1 | Game:PC or game console video |

FIG. 16

| Byte # | bits | | | | | | | |
|---|---|---|---|---|---|---|---|---|
| | 7 | 6 | 5 | 4 | 3 | 2 | 1 | 0 |
| 1 | Tag Code(07h) | | | Length of following data block (In bytes) (03h) | | | | |
| 2 | Extended Tag Code(05h) | | | | | | | |
| 3 | F37=0 | Adobe<sub>RGB</sub> | Adobe<sub>709</sub> | Adobe<sub>601</sub> | sYCC<sub>709</sub> | sYCC<sub>601</sub> | xvYCC<sub>709</sub> | xvYCC<sub>601</sub> |
| 4 | F47=0 | F46=0 | F45=0 | F44=0 | F43=0 | MD2 | MD1 | MD0 |

FIG. 17

| Byte# | bits | | | | | | | |
|---|---|---|---|---|---|---|---|---|
| | 7 | 6 | 5 | 4 | 3 | 2 | 1 | 0 |
| 1 | Tag Code(07h) | | | Length of following data block (In bytes) (02h) | | | | |
| 2 | Extended Tag Code(00h) | | | | | | | |
| 3 | QY | QS | S_PT1 | S_PT0 | S_IT1 | S_IT0 | S_CE1 | S_CE0 |

FIG. 19

| | | | | | | | |
|---|---|---|---|---|---|---|---|
| InfoFrame Type Code | InfoFrame Type =02₁₆ | | | | | | |
| InfoFrame Version Number | Version =02₁₆ | | | | | | |
| Length of AVI InfoFrame | Length of AVI InfoFrame(13) | | | | | | |
| Data Byte 1 | Rsvd(0) | Y1 | Y0 | A0 | B1 | B0 | S1 | S0 |
| Data Byte 2 | C1 | C0 | M1 | M0 | R3 | R2 | R1 | R0 |
| Data Byte 3 | CA | EC2 | EC1 | EC0 | Q1 | Q0 | SC1 | SC0 |
| Data Byte 4 | Rsvd(0) | VIC6 | VIC5 | VIC4 | VIC3 | VIC2 | VIC1 | VIC0 |
| Data Byte 5 | Q3 | Q2 | CT1 | CT0 | PR3 | PR2 | PR1 | PR0 |
| Data Byte 6,7 | Line Number of End of Top Bar | | | | | | |
| Data Byte 8,9 | Line Number of Start of Bottom Bar | | | | | | |
| Data Byte 10,11 | Pixel Number of End of Left Bar | | | | | | |
| Data Byte 12,13 | Pixel Number of Start of Right Bar | | | | | | |
| Data Byte 14…27 | Reserved(0) | | | | | | |

FIG. 20

| | | | | | Definition of Color Space | Definition of Quantization Range |
|---|---|---|---|---|---|---|
| CA | Content active | 0 | No Data | | | |
| | | 1 | — | Content active | Content active | |
| CT1,CT0 | Content | 00 | — | text | — | |
| | | 01 | — | Cinema | Photo | |
| | | 10 | — | Game | — | |
| | | 11 | — | — | — | |
| Y1,Y0 | RGB or YCbCr | 00 | RGB | RGB | RGB (sRGB) | |
| | | 01 | YUV 4:2:2 | YUV 4:2:2 | YUV 4:2:2 | |
| | | 10 | YUV 4:4:4 | YUV 4:4:4 | YUV 4:4:4 | |
| | | 11 | Future | Future | RGB (Adobe) | |
| C1,C0 | Colorimetry | 00 | No Data | No Data | No Data | |
| | | 01 | 601 | 601 | sRGB 601 | |
| | | 10 | 709 | 709 | sRGB 709 | |
| | | 11 | refer to EC2-EC0 | refer to EC2-EC0 | refer to EC2-EC0 | |
| EC2,EC1,EC0 | Extended Colorimetry | 000 | xvYCC 601 | xvYCC 601 | sYCC 601 | |
| | | 001 | xvYCC 709 | xvYCC 709 | sYCC 709 | |
| | | 010 | reserved | reserved | Adobe 601 | |
| | | 011 | reserved | reserved | Adobe 709 | |
| | | 100-111 | | | reserved | |
| Q3,Q2 | YUV Quantization Range | 00 | reserved | reserved | Default | |
| | | 01 | | | limited range | |
| | | 10 | | | full range | |
| | | 11 | | | reserved | |

F I G . 2 9

| InfoFrame Type Code | InfoFrame Type = 03₁₆ | |
|---|---|---|
| InfoFrame Version Number | Version 01₁₆ | |
| Length of Source Product Description InfoFrame | Length of Source Product Description InfoFrame=25 | |
| Data Byte 1 | 0 | Vendor Name Character 1 VN1 (7bit ASCII code) |
| Data Byte 2 | 0 | Vendor Name Character 2 VN2 |
| Data Byte 3 | 0 | Vendor Name Character 3 VN3 |
| Data Byte 4 | 0 | Vendor Name Character 4 VN4 |
| Data Byte 5 | 0 | Vendor Name Character 5 VN5 |
| Data Byte 6 | 0 | Vendor Name Character 6 VN6 |
| Data Byte 7 | 0 | Vendor Name Character 7 VN7 |
| Data Byte 8 | 0 | Vendor Name Character 8 VN8 |
| Data Byte 9 | 0 | Product Description Character 1 (7bit ASCII code) |
| Data Byte 10 | 0 | Product Description Character 2 PD2 |
| Data Byte 11 | 0 | Product Description Character 3 PD3 |
| Data Byte 12 | 0 | Product Description Character 4 PD4 |
| Data Byte 13 | 0 | Product Description Character 5 PD5 |
| Data Byte 14 | 0 | Product Description Character 6 PD6 |
| Data Byte 15 | 0 | Product Description Character 7 PD7 |
| Data Byte 16 | 0 | Product Description Character 8 PD8 |
| Data Byte 17 | 0 | Product Description Character 9 PD9 |
| Data Byte 18 | 0 | Product Description Character 10 PD10 |
| Data Byte 19 | 0 | Product Description Character 11 PD11 |
| Data Byte 20 | 0 | Product Description Character 12 PD12 |
| Data Byte 21 | 0 | Product Description Character 13 PD13 |
| Data Byte 22 | 0 | Product Description Character 14 PD14 |
| Data Byte 23 | 0 | Product Description Character 15 PD15 |
| Data Byte 24 | 0 | Product Description Character 16 PD16 |
| Data Byte 25 | | Source Device Information |

| Code | Source Device InformationCode |
|---|---|
| 00h | unknown |
| 01h | Digital STB |
| 02h | DVD player |
| 03h | D-VHS |
| 04h | HDD Videorecorder |
| 05h | DVC |
| 06h | DSC |
| 07h | Video CD |
| 08h | Game |
| 09h | PC general |
| 0Ah | Blu-Ray Disc(BD) |
| 0Bh | Super Audio CD |
| 0Ch ⋮ FFh | Reserved |

COMMUNICATION SYSTEM, TRANSMISSION APPARATUS, TRANSMISSION METHOD, RECEPTION APPARATUS AND RECEPTION METHOD

CROSS-REFERENCE TO RELATED APPLICATIONS

The present application is a continuation of U.S. application Ser. No. 14/191,909, filed Feb. 27, 2014, which is a continuation of U.S. application Ser. No. 13/652,942, filed Oct. 16, 2012, which is a continuation of U.S. application Ser. No. 12/450,142, filed Sep. 11, 2009, which is a national phase entry under 35 U.S.C. §371 of International Application No. PCT/JP2007/071405 filed on Nov. 2, 2007, published on Sep. 18, 2008 as WO 2008/111257 A1, which claims priority from Japanese Patent Application No. JP 2007-063327 filed in the Japanese Patent Office on Mar. 13, 2007 and Japanese Patent Application No. JP 2007-127415 filed in the Japanese Patent Office on May 11, 2007, all of which are hereby incorporated by reference herein.

BACKGROUND OF THE INVENTION

1. Technical Field

This invention relates to a communication system, a transmission apparatus, a transmission method, a reception apparatus and a reception method wherein a communication interface such as, for example, an HDMI (High Definition Multimedia Interface) is used. Particularly, the present invention relates to a communication system and so forth wherein an image signal having content identification information inserted in a blanking period thereof is sent in the form of differential signals through a plurality of channels whereas the reception side can carry out an optimum process for the image signal depending upon the type of the content based on the content identification information.

2. Background Art

In recent years, an HDMI has been and is being popularized as a communication interface which transmits a digital image signal, that is, a non-compressed (baseband) image signal (hereinafter referred to as "image data") and a digital sound signal (hereinafter referred to as "sound data") associated with the image signal at a high speed, for example, from a DVD (Digital Versatile Disc) recorder, a set top box or some other AV source (Audio Visual source) to a television receiver, a projector or some other display apparatus (refer to, for example, Patent Document 1).

As regards the HDMI, a TMDS (Transition Minimized Differential Signaling) channel for transmitting image data and sound data at a high speed unidirectionally from an HDMI source (HDMI Source) to an HDMI sink (HDMI Sink), a CEC line (Consumer Electronics Control Line) for carrying out bidirectional communication between an HDMI source and an HDMI sink and so forth are prescribed.
Patent Document 1: Japanese Patent Laid-Open No. 2006-319503

BRIEF SUMMARY OF THE INVENTION

Technical Problem

The HDMI described above originally is a communication interface for transmitting image data of a dynamic picture content. However, as types of contents, a still picture, a text, a cinema, a game and so forth exist in addition to a dynamic picture. On the reception side of image data, a process for displaying an image such as, for example, a process for contour emphasis and the like are carried out. However, it is demanded to make it possible to carry out an optimum process for such image data.

It is an object of the present invention to make it possible for the reception side to carry out an optimum process for an image signal (image data) depending upon the type of a content.

Technical Solution

A concept of the present invention resides in a transmission apparatus characterized in that the transmission apparatus includes an identification information insertion section configured to insert, into a blanking period of an image signal of a predetermined content to be transmitted, content identification information for the identification of a type of the predetermined content, and a transmission section configured to transmit the image signal having the content identification information inserted in the blanking period thereof by the identification information insertion section in the form of differential signals through a plurality of channels.

In the present invention, the identification information insertion section inserts, into a blanking period of an image signal of a predetermined content to be transmitted, content identification information for the identification of a type of the predetermined content. For example, the image signal of the predetermined content to be transmitted is obtained by reproduction from a recording medium by a reproduction section. Or, for example, the image signal of the predetermined content to be transmitted is obtained by picking up an image pickup object by means of a camera section.

The content identification information includes, for example, information indicative of a type of the content. Or, for example, the content identification information includes one or both of information indicative of a vendor name and information indicative of a type of a source apparatus. The content identification information is inserted into a blanking period of the image signal of the predetermined content using, for example, the AVI InfoFrame of the HDMI. Or, the content identification information is inserted into a blanking period of the image signal of the predetermined content using the SPD InfoFrame (vendor name region, source apparatus type region or the like) of the HDMI.

The transmission section transmits the image signal having the content identification information inserted in the blanking period thereof in this manner in the form of differential signals through a plurality of channels. Consequently, the reception side of the image signal can recognize from the content identification information inserted in the blanking period to what content the received image signal relates, and can carry out an optimum process for the image signal depending upon the type of the content.

In the present invention, for example, the content identification information may be identification information at least for the identification of whether or not the predetermined content is a still picture content. In this instance, the reception side can decide based on the content identification information whether or not the received image information relates to a still picture content, and can carry out an optimum process for the image signal which relates to a still picture content.

In the present invention, for example, the content identification information may be formed from a plurality of data placed hierarchically. For example, the content identification information is formed from first data formed from data of 1 bit and second data formed from data of 2 bits and used further when the first data is in one state. In this instance, the load to the decision process on the reception side can be moderated by placing data for the decision of a content which is transmitted in a high frequency into a higher hierarchical layer. For example, where the content identification information is formed from the first data of 1 bit and the second data of 2 bits described above, identification of five different contents, for example, a dynamic picture, a text, a still picture, a cinema and a game is possible. For example, where the transmission frequency of a dynamic picture is high, the first data of 1 bit is used as identification information of whether or not the content is a dynamic picture.

In the present invention, for example, the transmission apparatus further may include a color space information insertion section configured to insert color space information of the image signal into a blanking period of the image signal of the predetermined content to be transmitted, and the definition of the color space information may vary in response to a type of the content indicated by the content identification information. By the configuration, the reception side of the image signal can display an image based on the image signal using an optimum color space depending upon the type of the content.

In the present invention, for example, the definition of the color space information may vary at least depending upon whether or not the predetermined content is a still picture. In this instance, it is possible for the reception side to display an image based on the image signal of a still picture in an optimum color space.

In the present invention, for example, the transmission apparatus may further include a user operation section configured to allow a user to designate a color space of the image signal of the predetermined content to be transmitted. In this instance, the user can designate a desired color space taking a color space or the like supported by the reception side into consideration.

In the present invention, for example, the transmission apparatus may further include a color space information acquisition section configured to acquire information of color spaces which can be supported by a transmission destination of the image signal of the predetermined content to be transmitted from the transmission destination. In this instance, where the user designates a color space as described hereinabove, the user can easily recognize color spaces which are supported by the reception side.

In the present invention, for example, the transmission apparatus may be configured such that it further includes a user operation section configured to allow a user to designate a color space of the image signal of the predetermined content to be transmitted and the user can designate a predetermined color space from among the color spaces indicated based on the information of the color spaces acquired by the color space information acquisition section through the user operation section. In this instance, the user can avoid designation of a color space which is not supported by the reception side.

In the present invention, for example, the transmission apparatus may further include a color space setting section configured to select a predetermined color space from among the color spaces indicated by the information of the color spaces acquired by the color space information acquisition section to automatically set the color space of the image signal of the predetermined content to be transmitted. In this instance, since a color space supported by the reception side is automatically set, the labor and time of the user can be moderated.

Further, in the present invention, for example, the transmission apparatus may be configured such that it further includes a quantization range information insertion section configured to insert quantization range information of the image signal into a blanking period of the image signal of the predetermined content to be transmitted and the definition of the quantization range information varies depending upon the type of the predetermined content indicated by the content identification information. By the configuration, the reception side of the image signal can display an image based on the image signal in an optimum gradation according to the type of the content.

Further, in the present invention, for example, the definition of the quantization range information may vary at least depending upon whether or not the predetermined content is a still picture. In this instance, the reception side can display an image based on the image signal of the still picture content in an optimum gradation.

Another concept of the present invention resides in a reception apparatus characterized in that the reception apparatus includes a reception section configured to receive an image signal transmitted thereto in the form of differential signals through a plurality of channels and having content identification information for the identification of a type of a content inserted in a blanking period thereof, a display processing section configured to carry out a process for displaying for the image signal received by the reception section, and a control section configured to control operation of the display processing section based on the content identification information inserted in the blanking period of the image signal received by the reception section.

In the present invention, an image signal having content identification information inserted in a blanking period thereof and transmitted to the reception apparatus in the form of differential signals through a plurality of channels is received by the reception section. Then, the display processing section carries out a process for displaying such as contour emphasis for the received image signal. In this instance, the control section controls operation of the display processing section based on the content identification information inserted in the blanking period of the image signal received by the reception section. Consequently, the display processing section changes the operation thereof depending upon to what content the received image signal relates, and an optimum process is carried out for the image signal.

In the present invention, for example, the reception apparatus may be configured such that the display processing section includes at least a contour emphasis section configured to carry out contour emphasis for the image signal and the control section controls such that, when the content identification information indicates a text, the contour emphasis by the contour emphasis section is not carried out for the image signal. This can prevent characters from being made difficult to read by the contour emphasis.

In the present invention, for example, the reception apparatus may be configured such that the display processing section includes at least a color space changing section configured to change a color space and the control section controls the color space changing section such that, when the content identification information indicates a still picture, the color space is changed to a color space for a still picture. This makes it possible to favorably display an image based on the image signal of the still picture content in a color space for a still picture.

In the present invention, for example, the reception apparatus is configured such that the display processing section includes at least a gradation changing section configured to change a black side gradation and the control section controls the gradation changing section such that, when the content identification information indicates a cinema, a gradation on the black side is raised. By the configuration, in an image based on the image signal of the cinema content, the black side gradation is emphasized, and an image suitable for the cinema content can be displayed.

In the present invention, for example, the reception apparatus may be configured such that the display processing section includes at least a picture quality improvement section configured to carry out a process for picture quality change for the image signal and providing predetermined delay to the image signal and the control section controls such that, when the content identification information indicates a game, the process by the picture quality improvement section is not carried out for the image signal. By the configuration, delay of the image with respect to the sound can be moderated, and appearance of an unfamiliar feeling by the displacement between the sound and the image is prevented.

In the present invention, for example, the reception apparatus may be configured such that the content identification information indicates a still picture or a dynamic picture and the control section controls the display processing section such that, when the content identification information indicates the still picture, a process suitable for the still picture is carried out for the image signal, and controls the display processing section such that, when the content identification information indicates the dynamic picture, a process suitable for the dynamic picture is carried out for the image signal. This makes it possible to carry out an optimum process for the image signal depending upon the type of the content.

In the present invention, the reception apparatus may be configured such that the reception apparatus further includes a mode setting section configured to allow a user to set one of an auto mode, a still picture mode and a dynamic picture mode, the content identification information indicates a still picture or a dynamic picture, where the auto mode is set by the mode setting section, the control section controls the display processing section such that a process corresponding to the type (still picture or dynamic picture) of the content indicated by the content identification information is carried out for the image signal, and where the still picture mode or the dynamic picture mode is set by the mode setting section, the control section controls the display processing section such that a process suitable for the set mode is carried out for the image signal. By the configuration, by setting the still picture mode or the dynamic picture mode, the user can compulsorily cause the reception apparatus to carry out a process corresponding to a still picture or a dynamic picture for the image signal.

In the present invention, for example, the reception apparatus may be configured such that the content identification information indicates a still picture, a dynamic picture, a text, a cinema or a game and the control section controls the display processing section such that a process corresponding to the type (still picture, dynamic picture, text, cinema or game) of the content indicated by the content identification information is carried out for the image signal. This makes it possible to carry out an optimum process for the image signal depending upon the type of the content.

In the present invention, for example, the reception apparatus may be configured such that it further includes a mode setting section configured to allow a user to set one of auto, still picture, dynamic picture, text, cinema and game modes, the content identification information indicates a still picture, a dynamic picture, a text, a cinema or a game, and where the auto mode is set by the mode setting section, the control section controls the display processing section such that a process suitable for the type (still picture, dynamic picture, text, cinema or game) of the content indicated by the content identification information is carried out for the image signal, and where the still picture mode or the dynamic picture mode is set by the mode setting section, the control section controls the display processing section such that a process suitable for the set mode is carried out for the image signal. In this instance, by setting one of the still picture, dynamic picture, text, cinema and game modes, the user can cause the reception apparatus to compulsorily carry out a process suitable for the still, dynamic picture, text, cinema or game for the image signal.

In the present invention, for example, the reception apparatus may be configured such that, within a blanking period of the image signal received by the reception section, color space information whose definition varies in response to the type of the content indicated by the content identification information is inserted in addition to the content identification information and the control section controls operation of the display processing section based on the content identification information and the color space information inserted in the blanking period of the image signal received by the reception section. By the configuration, the operation of the display processing section is varied depending upon to what content the received image signal relates, and it is possible to display an image in an optimum color space depending upon the type of the content.

In the present invention, for example, the reception apparatus may be configured such that the display processing section includes at least a color gamut expansion section configured to expand the color gamut and the control section control the color gamut expansion section such that, when the color space indicated by the color space information is the sRGB, the color gamut expansion process is carried out for the image signal. This makes it possible to display a good image whose color gamut is expanded.

In the present invention, for example, the reception apparatus may be configured such that the color space information indicates a color space of the sRGB, sYCC or Adobe RGB and the control section sets the color space to the color space indicated by the color space information. This makes it possible to set an optimum color space corresponding to the image signal.

In the present invention, the reception apparatus may be configured such that the reception apparatus further includes a mode setting section configured to allow a user to set one of auto, sRGB, sYCC and Adobe RGB modes, the color space information indicates an sRGB, sYCC or Adobe RGB color space, and when the auto mode is set by the mode setting section, the control section sets the color space to a color space indicated by the color space information, and when the sRGB mode, the sYCC mode or the Adobe RGB mode is set by the mode setting section, the control section sets the color space to a color space corresponding to the set mode. By the configuration, by setting one of the sRGB, sYCC and Adobe RGB modes, the user can set the color space compulsorily to the sRGB, sYCC or Adobe RGB color space.

In the present invention, for example, the reception apparatus may be configured such that the quantization range information indicates a full range or a limited range and the control section sets the quantization range for the image signal to a quantization range indicated by the quantization range information. This makes it possible to set the quantization range for the image signal to an optimum quantization range suitable for the image signal.

In the present invention, the reception apparatus may be configured such that it further includes a mode setting section configured to allow a user to set one of auto, full range and limited range modes, the quantization range information indicates full range of limited range, and when the auto mode is set by the mode setting section, the control section sets the quantization range for the image signal to a quantization range indicated by the quantization range information, and when the full range mode or the limited range mode is set by the mode setting section, the control section sets the quantization range for the image signal to a quantization range corresponding to the set mode. By the configuration, by setting one of the full range and limited range modes, the user can set the quantization range for the image signal compulsorily to the full range or the limited range.

In the present invention, the reception apparatus may be configured such that, in the blanking period of the image signal received by the reception section, quantization range information of the image signal whose definition varies in response to the type of the content indicated by the content identification information is inserted in addition to the content identification information, and the control section controls operation of the display processing section based on the content identification information and the quantization range information inserted in the blanking period of the image signal received by the reception section. Consequently, the operation of the display processing section changes depending upon to what content the received image signal relates, and it is possible to display an image with an optimum gradation suitable for the type of the content.

In the present invention, for example, the reception apparatus may further include a tuner for receiving a broadcasting signal, and a switch for selectively supplying an image signal received by the tuner or the image signal received by the reception section to the display processing section. In this instance, not only an image based on the image signal received by the reception section but also an image based on the image signal received by the tuner can be displayed.

In the present invention, for example, the reception apparatus may be configured such that the display processing section includes an OSD portion and the control section controls the OSD portion such that a type of the content indicated by the content identification information or a type of a color space indicated by the color space information is OSD displayed. In this instance, the user can easily recognize the type of the content or the type of the color space based on the OSD display.

In the present invention, for example, the reception apparatus may be configured such that the display processing section includes an OSD portion and the control section controls the OSD portion such that, when a color space indicated by the color space information is not supported, that the color space is not supported is OSD displayed. In this instance, the user can easily recognize based on the OSD display that an image signal of a color space which is not supported by the reception apparatus has been sent to the reception apparatus from the transmission side.

A further concept of the present invention resides in a reception apparatus characterized in that the reception apparatus includes a reception section configured to receive an image signal of a predetermined content which has content identification information for the identification of a type of a content, a display processing section configured to carry out a process for displaying for the image signal received by the reception section, and a control section configured to control operation of the display processing section based on the content identification information which the image signal received by the reception section has.

In the present invention, an image signal of a predetermined content having content identification information for the identification of the type of the content is received by the reception section. For example, the content identification information is inserted in a blanking period of the image signal. Further, for example, the content identification information includes information of the compression method of the image signal.

Then, the display processing section carries out a process for displaying such as contour emphasis for the received image signal. In this instance, the control section controls operation of the display processing section based on the content identification information which the image signal received by the reception section has. Consequently, the operation of the display processing section is changed depending upon to what content the received image signal relates, and an optimum process is carried out for the image signal.

In the present invention, for example, the reception apparatus may be configured such that the reception section receives a compressed image signal inputted to an input terminal such as a USB terminal and the control section controls the display processing section such that, when the image signal received by the reception section is a JPEG file, a still picture process is carried out for the image signal. In this instance, the image signal is an image signal of a still picture content, and the display processing section carries out an optimum process for the image signal.

In the present invention, for example, the reception apparatus may be configured such that the reception section receives a compressed image signal inputted to a USB terminal and the control section controls the display processing section such that, when the image signal received by the reception section is a JPEG file and a particular maker code is included in a tag of the JPEG file, a still picture process is carried out for the image signal. In this instance, the image signal is an image signal of a still picture content, and the display processing section carries out an optimum process for the image signal.

Advantageous Effects

According to the present invention, an image signal in which content identification information for the identification of the type of a content is inserted is transmitted, and on the reception side, an optimum process suitable for the type of the content can be carried out for the image signal based on the content identification information.

BRIEF DESCRIPTION OF THE DRAWINGS

FIG. 5 is a view illustrating a structure of TMDS transmission data.

FIG. 6 is a timing chart illustrating a relationship between control bits CTL0 and CTL1 and a data island interval and a control interval.

FIG. 7 is a view illustrating a data structure of an AVI InfoFrame packet.

FIG. 8 is a view illustrating a corresponding relationship between content identification information placed in the AVI InfoFrame packet and content types.

FIG. 16 is a view illustrating an example of a data structure of a color space data block (Colorimetory Data Block) as an E-EDID.

FIG. 17 is a view illustrating an example of a data structure of a video performance data block (Video Capability Data Block) as an E-EDID.

FIG. 19 is a view illustrating a data structure of an AVI InfoFrame packet.

FIG. 20 is a view illustrating an example of a definition of color space information and quantization range information depending upon a content.

FIG. 29 is a view illustrating a configuration of SPD InfoFrame.

EXPLANATION OF REFERENCE SYMBOLS

40 . . . AV system, 41 . . . HD recorder, 42 . . . Display unit, 43 . . . HDMI cable, 51 . . . Recording and reproduction section, 52 . . . Codec, 53 . . . HDMI source, 54 . . . HD, 55 . . . External apparatus, 61 . . . HDMI sink, 62 . . . Display processing section, 62a . . . Chroma decoder, 62b . . . DRC portion, 62c . . . Enhancer, 62d . . . Panel driver, 63 . . . Display section, 63a . . . Liquid crystal panel, 63b . . . Backlight, 71 . . . Source signal processing section, 72 . . . HDMI transmitter, 81 . . . HDMI receiver, 82 . . . Sink signal processing section, 140 . . . AV system, 141 . . . Video camera, 142 . . . Television receiver, 143 . . . HDMI cable, 151 . . . Control section, 152 . . . User operation section, 153 . . . Display section, 154 . . . Image pickup lens, 155 . . . Image pickup element, 156 . . . Picked up image signal processing section, 157 . . . Codec, 158 . . . Recording and reproduction section, 159 . . . HD, 160 . . . HDMI source, 161 . . . External apparatus, 171 . . . Control section, 172 . . . User operation section, 174 . . . Tuner, 175 . . . Antenna terminal, 176 . . . Switch, 177 . . . Display processing section, 177a . . . Chroma decoder, 177b . . . DRC portion, 177c . . . Enhancer, 177d . . . Panel driver, 178 . . . Display section, 178a . . . Liquid crystal panel, 178b . . . Backlight, 180 . . . AV system, 181 . . . Video camera, 181a, 182 . . . USB terminal, 182 . . . Television receiver, 183 . . . USB cable

DETAILED DESCRIPTION

Best Mode for Carrying Out the Invention

In the following, embodiments of the present invention are described with reference to the drawings.

Figure 1:
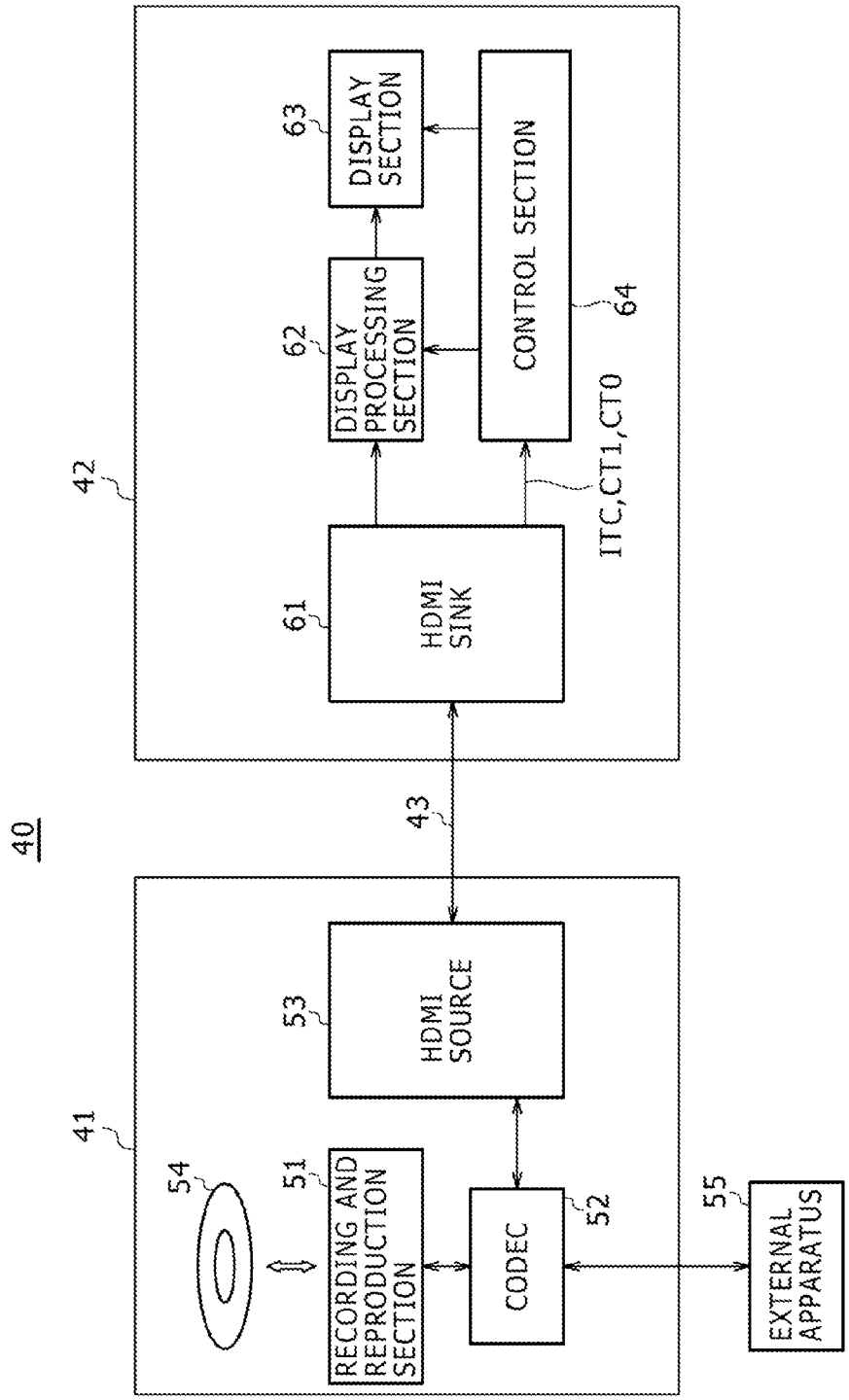
FIG. 1 is a block diagram showing an example of a configuration of an AV system as an embodiment.

FIG. 1 shows an example of a configuration of an AV system 40 to which the present invention is applied. Referring to FIG. 1, the AV system 40 is composed of an HD (Hard Disk) recorder 41 as a transmission apparatus and a display unit 42 as a reception apparatus. The HD recorder 41 and the display unit 42 are connected to each other by a cable 43 for the HDMI.

The HD recorder 41 has a recording and reproduction section 51, a codec 52, an HDMI source 53 and an HD 54 and carries out recording and reproduction of data on and from the HD 54. In particular, the recording and reproduction section 51 records encoded data obtained by encoding image data (image signal) and sound data (sound signal) associated with the image data, which are supplied from the codec 52, for example, in accordance with an MPEG (Moving Picture Experts Group) system or the like on the HD 54. Further, the recording and reproduction section 51 reproduces (reads out) encoded data from the HD 54 and supplies the encoded data to the codec 52.

The codec 52 decodes encoded data supplied thereto from the recording and reproduction section 51 into data of an image and sound of a baseband (in a non-compressed form) in accordance with the MPEG system or the like and supplies the baseband image and sound data to the HDMI source 53 and an external apparatus 55. Further, the codec 52 encodes baseband image and sound data supplied thereto from the external apparatus 55 into encoded data and supplies the encoded data to the recording and reproduction section 51. Here, the external apparatus 55 is a different HD recorder, a personal computer, a DVD (Digital Versatile Disc) player, a digital camera or the like.

The HDMI source 53 transmits baseband image and sound data supplied from the codec 52 unidirectionally to the display unit 42 through the cable 43 by communication complying with the HDMI. In this significance, the HDMI source 53 forms a transmission section. Further, the HDMI source 53 inserts content identification information for the identification of a content type of image data to be transmitted, that is, to what content the image data relates, into a blanking period of image data (image signal) to be transmitted. In this significance, the HDMI source 53 forms an identification information insertion section. Details of this content identification information are hereinafter described.

The display unit 42 has an HDMI sink 61, a display processing section 62, a display section 63 and a control section 64, and carries out display of an image and so forth. In particular, the HDMI sink 61 receives baseband image and sound data transmitted unidirectionally thereto from the HDMI source 53 of the HD recorder 41 connected thereto through the cable 43 by communication complying with the HDMI. In this significance, the HDMI sink 61 forms a reception section.

The HDMI sink 61 supplies received image data to the display processing section 62. It is to be noted that data of sound received by the HDMI sink 61 is supplied to a speaker not shown, for example, built in the display unit 42. From the speaker, sound based on the received sound data is outputted.

The display processing section 62 carries out such a process as contour emphasis for display for image data received by the HDMI sink 61. The display section 63 displays an image based on image data processed by the display processing section 62. The display section 63 is formed, for example, from an LCD (Liquid Crystal Display) unit, an organic EL (ElectroLuminescence) unit, a CRT (Cathode Ray Tube) or the like. The control section 64 controls operation of the display processing section 62 and the display section 63. In the present embodiment, content identification information inserted in a blanking period of image data as described above from the HDMI sink 61. The control section 64 controls, based on the content identification information, operation of the display processing section 62 and the display section 63 in response to the content type of image data received by the HDMI sink 61.

Figure 2:
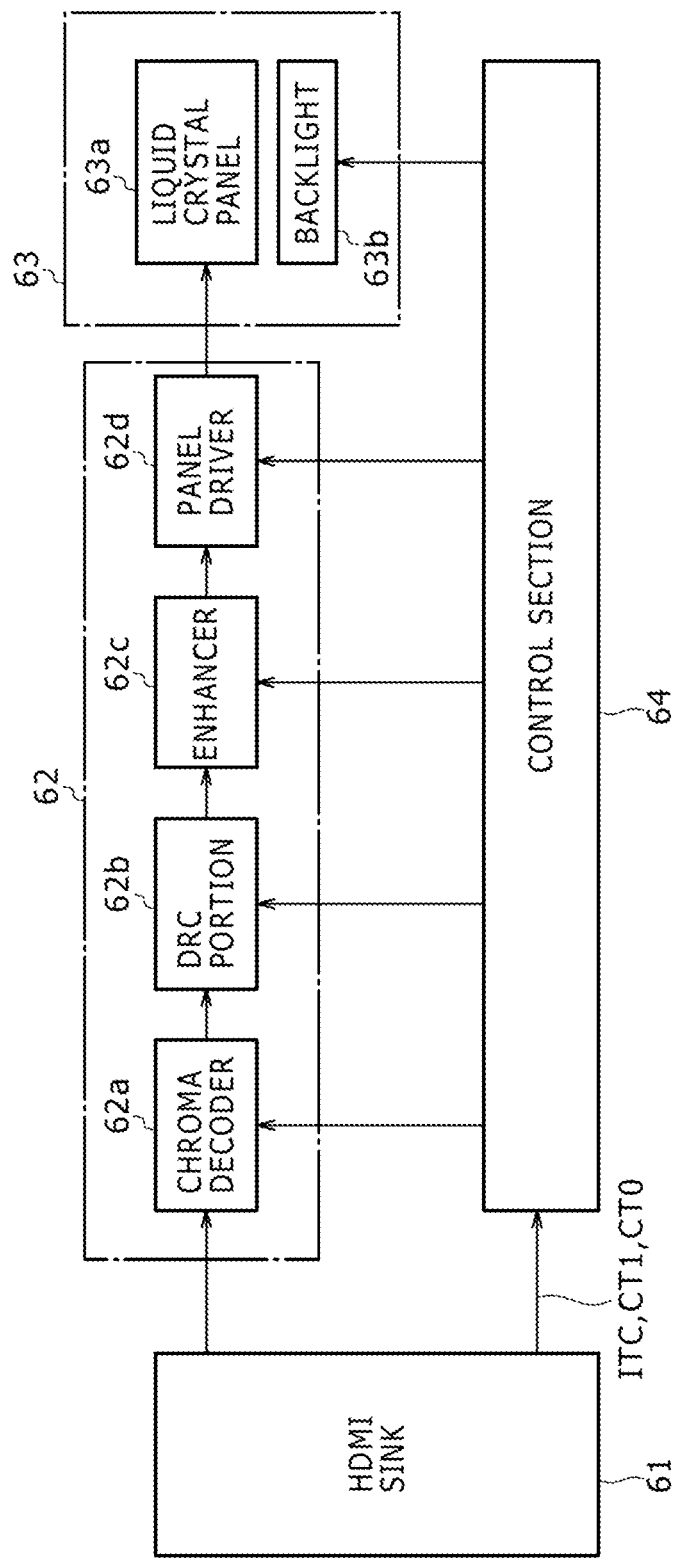
FIG. 2 is a block diagram showing an example of a particular configuration of a display processing section and a display section of a display unit.

FIG. 2 shows an example of a particular configuration of the display processing section 62 and the display section 63. Referring to FIG. 2, the display processing section 62 is composed of a chroma decoder 62a, a DRC (Digital Reality Creation) portion 62b, an enhancer 62c and a panel driver 62d.

The chroma decoder 62a carries out a process regarding a color such as change of a color space for image data supplied thereto from the HDMI sink 61. The chroma decoder 62a forms a color space changing section. The DRC portion 62b carries out a process for improving the picture quality for image data outputted from the chroma decoder 62a. In this instance, the DRC portion 62b regenerates, for example, pixel data of a pixel of interest in response to a pattern including peripheral pixel data to carry out picture quality improvement. This DRC portion 62b forms a picture quality improvement section.

The enhancer 62c carries out a process for contour emphasis for image data outputted from the DRC portion 62b. This enhancer 62c forms a contour emphasis section. The panel driver 62d drives a liquid crystal panel 63a which composes the display section 63 hereinafter described based on image data outputted from the enhancer 62c. This panel driver 62d carries out also gamma correction. The panel driver 62d forms a gradation changing section.

Further, referring to FIG. 2, the display section 63 is composed of a liquid crystal panel 63a and a backlight 63b. The liquid crystal panel 63a is driven by the panel driver 62d described hereinabove to display an image based on image data. The backlight 63b is formed, for example, from a white fluorescent tube.

An example of operation of the AV system 40 of FIG. 1 which is configured in such a manner as described above is described.

For example, if the HD recorder 41 is operated so as to reproduce the HD 54 (in FIG. 1, user operation means is not shown), then the recording and reproduction section 51 reproduces encoded data from the HD 54 and supplies the reproduced encoded data to the codec 52. The codec 52 decodes the encoded data supplied thereto from the recording and reproduction section 51 into baseband image and sound data and supplies the baseband image and sound data to the HDMI source 53.

The HDMI source 53 inserts content identification information into a blanking period of the image data supplied thereto from the codec 52. Then, the HDMI source 53 transmits the image data of the baseband, which has the content identification information inserted in a blanking period thereof, and the sound data of the baseband supplied thereto from the codec 52 unidirectionally to the display unit 42 through the HDMI cable 43 by communication complying with the HDMI.

In the display unit 42, the HDMI sink 61 receives the baseband image and sound data transmitted unidirectionally thereto from the HDMI source 53 of the HD recorder 41 connected thereto through the HDMI cable 43 by communication complying with the HDMI. Then, the HDMI sink 61 supplies the image data to the display processing section 62 and supplies the sound data to the speaker not shown. Further, the HDMI sink 61 supplies a control signal inserted in a blanking period of the image data, for example, content identification information, to the control section 64.

The display processing section 62 carries out a process suitable for the content type of the image data for the image data under the control of the control section 64 and supplies the image data after the process to the display section 63. The display section 63 displays an image based on the image data supplied thereto from the display processing section 62.

Figure 3:
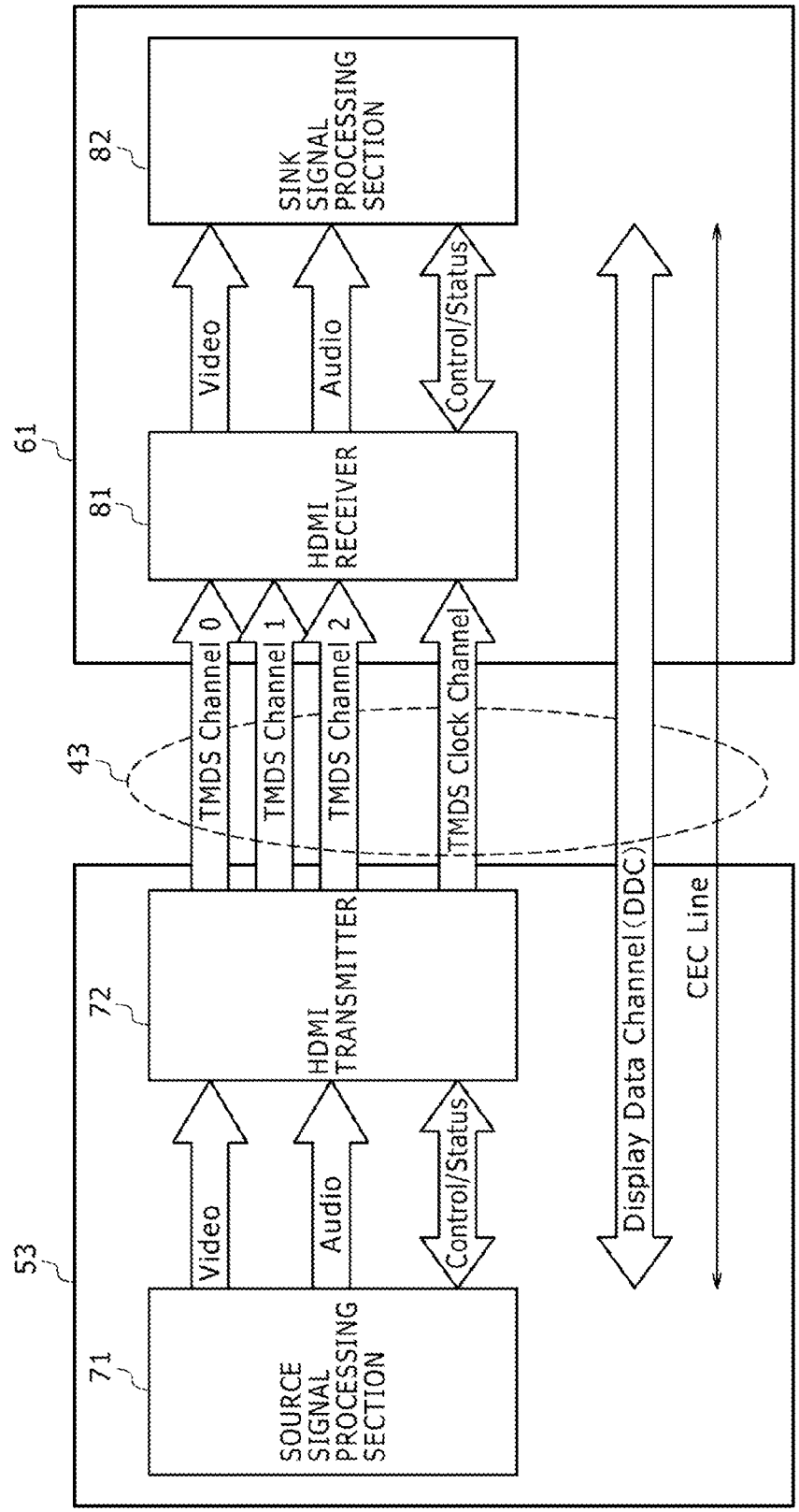
FIG. 3 is a block diagram showing an example of a configuration of an HDMI source and an HDMI sink.

FIG. 3 shows an example of a configuration of the HDMI source 53 and the HDMI sink 61 of FIG. 1.

The HDMI source 53 transmits differential signals of image data for one screen image of the baseband (in a non-compressed form) unidirectionally to the HDMI sink 61 through a plurality of channels within an effective image interval (hereinafter referred to suitably as "active video interval") which is an interval obtained by removing a horizontal blanking period and a vertical blanking period from an interval (hereinafter referred to suitably as "video field") from a certain vertical synchronizing signal to a next vertical synchronizing signal. Further, the HDMI source 53 transmits differential signals corresponding to sound data and a control packet (Control Packet) associated with the image data and other auxiliary data and so forth unidirectionally to the HDMI sink 61 through a plurality of channels within a horizontal blanking period and a vertical blanking period.

The HDMI source 53 has a source signal processing section 71 and an HDMI transmitter 72. To the source signal processing section 71, non-compressed data of an image (Video) and sound (Audio) of the baseband are supplied from the codec (refer to FIG. 1) or the like. The source signal processing section 71 carries out a necessary process for the image and sound data supplied thereto and supplies the processed data to the HDMI transmitter 72. Further, the source signal processing section 71 transfers controlling information, information (Control/Status) for the notification of a status and so forth to and from the HDMI transmitter 72 as occasion demands.

The HDMI transmitter 72 converts the image data supplied from the source signal processing section 71 into corresponding differential signals and transmits the differential signals unidirectionally to the HDMI sink 61 connected thereto by the HDMI cable 43 through three TMDS channels #0, #1 and #2 which are a plurality of channels.

Further, the transmitter 72 converts sound data, a control packet and other auxiliary data (auxiliary data) associated with the non-compressed image data and control data (control data) such as a vertical synchronizing signal (VSYNC) and a horizontal synchronizing signal (HSYNC) into corresponding differential signals and transmits the differential signals unidirectionally to the HDMI sink 61 connected thereto by the HDMI cable 43 through the three TMDS channels #0, #1 and #2.

Further, the transmitter 72 transmits a pixel clock synchronized with the image data transmitted through the three TMDS channels #0, #1 and #2 to the HDMI sink 61 connected thereto by the HDMI cable 43 through a TMDS clock channel.

The HDMI sink 61 receives differential signals corresponding to image data and transmitted thereto unidirectionally from the HDMI source 53 through a plurality of channels within an active video interval and receives differential signals corresponding to auxiliary data and control data and transmitted thereto from the HDMI source 53 through a plurality of channels within a horizontal blanking period and a vertical blanking period.

The HDMI sink 61 has an HDMI receiver 81 and a sink signal processing section 82. The HDMI receiver 81 receives differential signals corresponding to image data and differential signals corresponding to auxiliary data and control data, transmitted unidirectionally thereto from the HDMI source 53 connected thereto by the HDMI cable 43 through the TMDS channels #0, #1 and #2, in synchronism with the pixel clock transmitted thereto through the TMDS clock channel from the HDMI source 53 similarly. Further, the HDMI receiver 81 converts the differential signals into corresponding image data, auxiliary data and control data and supplies the resulting data to the sink signal processing section 82 as occasion demands.

The sink signal processing section 82 carries out a necessary process for the data supplied thereto from the HDMI receiver 81 and supplies the processed data to the display processing section 62, control section 64 and so forth. Further, the sink signal processing section 82 transfers controlling information, information (Control/Status) for the notification of a status and so forth to and from the HDMI receiver 81 as occasion demands.

Transmission channels of the HDMI include, in addition to the three TMDS channels #0, #1 and #2 for transmitting image data, auxiliary data and control data serially and unidirectionally from the HDMI source 53 to the HDMI sink 61 in synchronism with the pixel clock and the TMDS clock channel as a transmission channel for transmitting the pixel clock, a DDC (Display Data Channel) and a transmission channel called CEC line.

The DDC is used to read out an E-EDID (Enhanced Extended Display Identification) from the HDMI sink 61 connected thereto by the HDMI cable 43.

In particular, the HDMI sink 61 has an EDID ROM (Read Only Memory) not shown which stores an E-EDID which is information regarding a performance (Configuration/capability) of the HDMI sink 61 itself in addition to the HDMI receiver 81. The HDMI source 53 reads out the E-EDID of the HDMI sink 61 through the DDC from the HDMI sink 61 connected thereto by the HDMI cable 43 and recognizes setting of the performance of the HDMI sink 61, that is, a format (profile) of an image with which, for example, an electronic apparatus which has the HDMI sink 61 is compatible, for example, RGB, YCbCr4:4:4, YCbCr4:2:2 or the like, based on the E-EDID.

It is to be noted that also the HDMI source 53 stores an E-EDID similarly to the HDMI sink 61 and can transmit the E-EDID to the HDMI sink 61 as occasion demands.

The CEC line is used to carry out bidirectional communication of controlling data between the HDMI source 53 and the HDMI sink 61.

Figure 4:
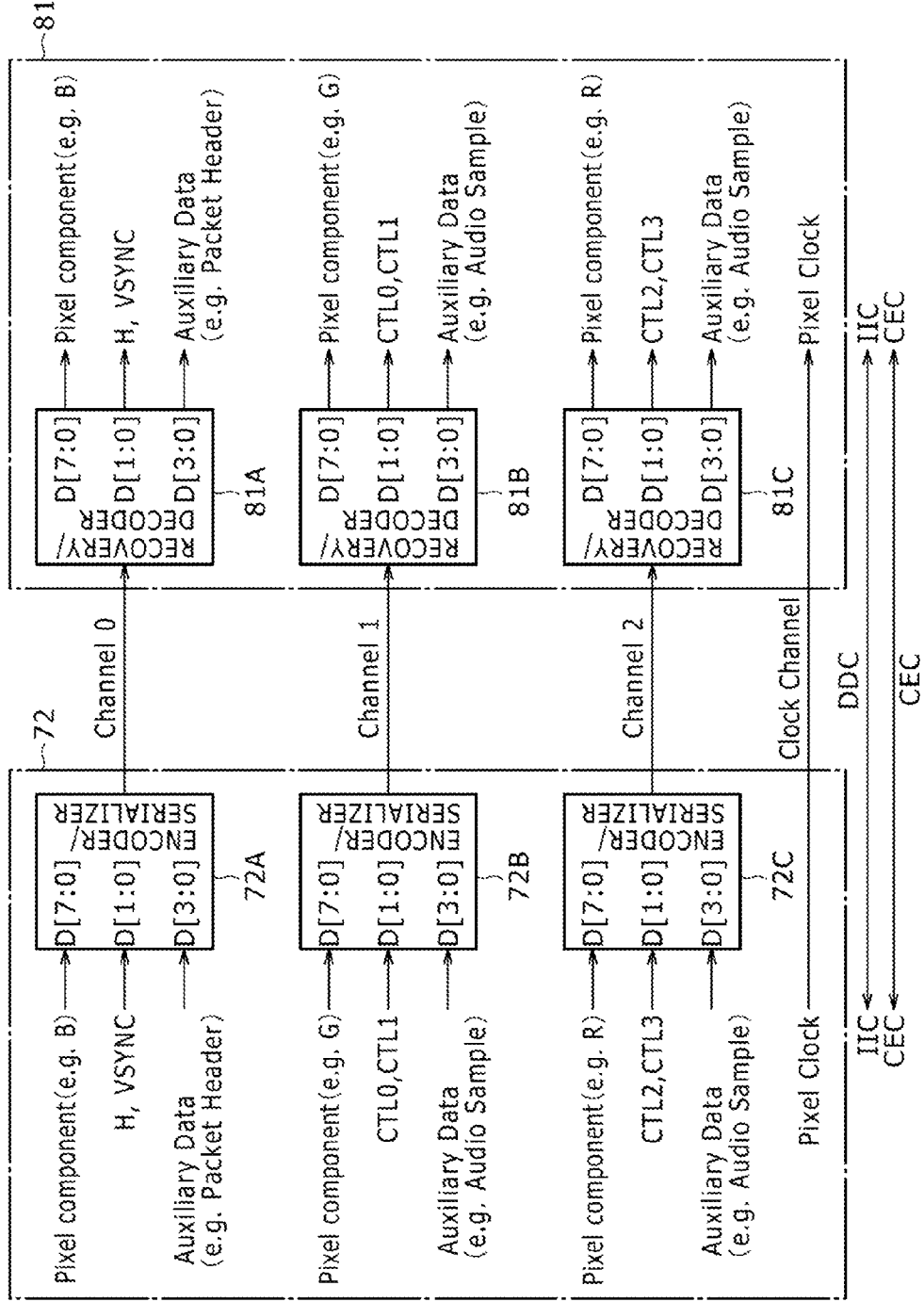
FIG. 4 is a block diagram showing an example of a configuration of an HDMI transmitter and an HDMI receiver.

FIG. 4 shows an example of a configuration of the HDMI transmitter 72 and the HDMI receiver 81 of FIG. 3.

The HDMI transmitter 72 has three encoders/serializers 72A, 72B and 72C which correspond to the three TMDS channels #0, #1 and #2, respectively. Further, the encoders/serializers 72A, 72B and 72C individually encode image data, auxiliary data and control data supplied thereto, convert the encoded data from parallel data into serial data and transmit the serial data as differential signals. Here, where the image data has, for example, three components of R (red), G (green) and B (blue), the B component (B component is supplied to the encoder/serializer 72A; the G component (G component) is supplied to the encoder/serializer 72B; and the R component (R component) is supplied to the encoder/serializer 72C.

Further, as auxiliary data, for example, sound data and a control packet are used, and the control packet is supplied, for example, to the encoder/serializer 72A and the sound data is supplied to the encoders/serializers 72B and 72C.

Furthermore, as the control data, a vertical synchronizing signal (VSYNC) of 1 bit, a horizontal synchronizing signal (HSYNC) of 1 bit and control bits CTL0, CTL1, CTL2 and CTL3 of 1 bit are used. The vertical synchronizing signal and the horizontal synchronizing signal are supplied to the encoder/serializer 72A. The control bits CTL0 and CTL1 are supplied to the encoder/serializer 72B, and the control bits CTL2 and CTL3 are supplied to the encoder/serializer 72C.

The encoder/serializer 72A time divisionally transmits a B component of image data, a vertical synchronizing signal and a horizontal synchronizing signal, and auxiliary data supplied thereto. In particular, the encoder/serializer 72A converts a B component of the image data supplied thereto into parallel data of a unit of 8 bits as a fixed bit number. Further, the encoder/serializer 72A encodes the parallel data, converts the encoded parallel data into serial data and transmits the serial data through the TMDS channel #0.

Further, the encoder/serializer 72A encodes parallel data of 2 bits of a vertical synchronizing signal and a horizontal synchronizing signal supplied thereto, converts the encoded data into serial data and transmits the serial data through the TMDS channel #0. Furthermore, the encoder/serializer 72A converts auxiliary data supplied thereto into parallel data of a unit of 4 bits. Then, the encoder/serializer 72A encodes the parallel data, converts the encoded data into serial data and transmits the serial data through the TMDS channel #0.

The encoder/serializer 72B time divisionally transmits a G component of image data, control bits CTL0 and CTL1 and auxiliary data supplied thereto. In particular, the encoder/serializer 72B converts a G component of the image data supplied thereto into parallel data of a unit of 8 bits as a fixed bit number. Further, the encoder/serializer 72B encodes the parallel data, converts the encoded data into serial data and transmits the serial data through the TMDS channel #1.

Further, the encoder/serializer 72B encodes 2-bit parallel data of the control bits CTL0 and CTL1 supplied thereto, converts the encoded data into serial data and transmits the serial data through the TMDS channel #1. Further, the encoder/serializer 72B converts auxiliary data supplied thereto into parallel data of a unit of 4 bits. Then, the encoder/serializer 72B encodes the parallel data, converts the encoded data into serial data and transmits the serial data through the TMDS channel #1.

The encoder/serializer 72C time divisionally transmits an R component of image data, control bits CTL2 and CTL3 and auxiliary data supplied thereto. In particular, the encoder/serializer 72C converts an R component of the image data supplied thereto into parallel data of a unit of 8 bits as a fixed bit number. Further, the encoder/serializer 72C encodes the parallel data, converts the encoded data into serial data and transmits the serial data through the TMDS channel #2.

Further, the encoder/serializer 72C encodes 2-bit parallel data of the control bits CTL2 and CTL3 supplied thereto, converts the encoded data into serial data and transmits the serial data through the TMDS channel #2. Further, the encoder/serializer 72C converts the auxiliary data supplied thereto into parallel data of a unit of 4 bits. Then, the encoder/serializer 72C encodes the parallel data, converts the encoded data into serial data and transmits the serial data through the TMDS channel #2.

The HDMI receiver 81 has three recovery/decoders 81A, 81B and 81C which correspond to the three TMDS channels #0, #1 and #2, respectively. Further, the recovery/decoders 81A, 81B and 81C individually receive image data, auxiliary data and control data transmitted thereto in the form of differential signals through the TMDS channels #0, #1 and #2. Further, the recovery/decoders 81A, 81B and 81C individually convert the image data, auxiliary data and control data from serial data into parallel data, decode the parallel data and output the decoded data.

In particular, the recovery/decoder 81A receives a B component of the image data, the vertical synchronizing signal and the horizontal synchronizing signal and the auxiliary data transmitted thereto in the form of differential signals through the TMDS channel #0. Then, the recovery/decoder 81A converts a B component of the image data, the vertical synchronizing signal and horizontal synchronizing signal, and auxiliary data from serial data into parallel data, decodes the parallel data and outputs the decoded data.

The recovery/decoder 81B receives a G component of the image data, control bits CTL0 and CTL1 and auxiliary data transmitted thereto in the form of differential signals through the TMDS channel #1. Then, the recovery/decoder 81B converts the G component of the image data, control bits CTL0 and CTL1 and auxiliary data from serial data into parallel data, decodes the parallel data and outputs the decoded data.

The recovery/decoder 81C receives an R component of the image data, control bits CTL2 and CTL3 and auxiliary data transmitted in the form of differential signals through the TMDS channel #2. Then, the recovery/decoder 81C converts the R component of the image data, control bits CTL2 and CTL3 and auxiliary data from serial data into parallel data, decodes the parallel data and outputs the decoded data.

FIG. 5 illustrates an example of a transmission interval (period) within which various transmission data are transmitted through the three TMDS channels #0, #1 and #2 of the HDMI. It is to be noted that, in the TMDS channels #0, #1 and #2, FIG. 5 illustrates an interval of various transmission data in a case wherein a progressive image of 720×480 pixels in the horizontal×vertical directions is transmitted.

In a video field (Video Field) within which transmission data are transmitted through the three TMDS channels #0, #1 and #2 of the HDMI, three different intervals of a video data interval (Video Data period), a data island interval (Data Island period) and a control interval (Control period) exist in accordance with the types of transmission data.

Here, the video field interval is an interval from a rising edge (active edge) of a certain vertical synchronizing signal to a rising edge of a next vertical synchronizing signal and is divided into a horizontal blanking period (horizontal blanking), a vertical blanking period (vertical blanking) and an active video interval (Active Video) which is a period obtained by removing the horizontal blanking period and the vertical blanking period from the video field period.

The video data interval is allocated to the active video interval. Within this video data interval, data of effective pixels (Active pixel) for 720 pixels×480 lines which form image data for one screen image in a non-compressed state are transmitted.

The data island interval and the control interval are allocated to the horizontal blanking period and the vertical blanking period. Within the data island interval and the control interval, auxiliary data (Auxiliary data) are transmitted.

In particular, the data island interval is allocated to part of the horizontal blanking period and the vertical blanking period. Within the data island interval, a packet of data which do not relate to control from among the auxiliary data such as, for example, sound data, is transmitted.

The control interval is allocated to the other part of the horizontal blanking period and the vertical blanking period. Within the control interval, for example, the vertical synchronizing signal and horizontal synchronizing signal, a control packet and so forth which are data which relate to control from among the auxiliary data are transmitted.

Here, according to the existing HDMI, the frequency of the pixel clock transmitted by the TMDS clock channel is, for example, 165 MHz, and in this instance, the transmission rate in the data island interval is approximately 500 Mbps.

Although auxiliary data are transmitted within both of the data island interval and the control interval as described above, the distinction between them is carried out based on the control bits CTL0 and CTL1. In particular, FIG. 6 illustrates a relationship between the control bits CTL0 and CTL1 and the data island interval and control interval.

The control bits CTL0 and CTL1 can represent two states of a device enable (device enable) state and a device disable (device disable) state as indicated at the top of FIG. 6. It is to be noted that, at the top of FIG. 6, the device enable state is represented by the H (High) level while the device disable state is represented by the L (Low) level. The control bits CTL0 and CTL1 exhibit the device disable state within the data island interval but exhibit the device enable state within the control period, and by this, the data island interval and the control interval are distinguished from each other.

Then, within the data island interval within which the control bits CTL0 and CTL1 exhibit the L level as the device disable state, for example, sound data or the like which are data which do not relate to control from among the auxiliary data are transmitted as seen from the second top of FIG. 6. On the other hand, within the control interval within which the control bits CTL0 and CTL1 exhibit the H level as the device enable state, for example, a control packet, a preamble and so forth which are data which relate to control from among the auxiliary data are transmitted as seen from the third top of FIG. 6. Further, within the control interval, also the vertical synchronizing signal and the horizontal synchronizing signal are transmitted as seen from the fourth top of FIG. 6.

Now, description is given of content identification information to be inserted into blanking periods of image data (image signal) by the HDMI source 53 of the HD recorder 41 as described hereinabove.

FIG. 7 illustrates a data structure of an AVI (Auxiliary Video Information) InfoFrame packet placed in the data island interval described above. In the HDMI, associated information regarding an image can be transmitted from a source apparatus to a sink apparatus using the AVI InfoFrame Packet.

In the present embodiment, the content identification information is placed hierarchically into 1 bit of the ITC of the sixth byte (Data Byte 3) and 2 bits of the CT1 and CT0 of the eighth byte (Data Byte 5) as seen from the data structure of the AVI InfoFrame illustrated in FIG. 7.

The ITC which is data of 1 bit is used for the identification of whether the content is a dynamic picture content. Here, if ITC=0, then this indicates that the content is an ordinary dynamic picture content, but if ITC=1, then this indicates that the content is not an ordinary dynamic picture content. The CT1 and CT0 which are 2-bit data are effective when ITC=1. In other words, when it is decided based on the ITC that the content is not an ordinary dynamic picture content, the CT1 and CT0 are used further.

In the present embodiment, the CT1 and CT0 make it possible to identify four contents of a text content, a photograph (still picture) content, a cinema content and a game content as seen in FIG. 8. In particular, when CT1=0 and CT0=0, they indicate that the content is a text content. When CT1=0 and CT0=1, they indicate that the content is a photograph content. When CT1=1 and CT0=0, they indicate that the content is a cinema content. When CT1=1 and CT0=1, they indicate that the content is a game content.

Here, the text content signifies a popular IT (Information Technology) content. The photograph content signifies a content of a still picture. The cinema content signifies a content of a cinema or a home video. The game content signifies a content of a PC or a game console video.

Now, an example of a control process by the control section 64 of the display unit 42 wherein the content identification information is used where the content identification information is composed of 1-bit data (ITC) and 2-bit data (CT1 and CT0) as described hereinabove is described with reference to a flow chart of FIG. 9.

The control section 64 starts the control process first at step ST1 and then advances the processing to step ST2. At step ST2, the control section 64 decides whether or not ITC=1 is satisfied. If ITC=1 is not satisfied, then the control section 64 recognizes that the received image data are data of an ordinary dynamic picture content, and carries out an ordinary dynamic picture process at step ST3.

In particular, the control section 64 controls the chroma decoder 62a to set a color space for a dynamic picture, for example, an sRGB color space. Further, the control section 64 controls the DRC portion 62b to carry out a picture quality improvement process. Furthermore, the control section controls the enhancer 62c to emphasize high frequency components to carry out contour emphasis. Further, the control section 64 controls the panel driver 62d to carry out ordinary gamma correction. Further the control section 64 controls the backlight 63b to exhibit an ordinary color temperature.

When ITC=1 is decided at step ST2, the control section 64 advances the processing to step ST4. At step ST4, the control section 64 decides whether or not CT1=0 is satisfied. Then, if CT1=0 is satisfied, then the control section 64 decides at step ST5 whether or not CT0=0 is satisfied.

If CT0=0 is satisfied, then the control section 64 recognizes that the received image data relate to a text content, and carries out a text (Text) process at step ST6. In this instance, the control section 64 controls operation of the enhancer 62c so that contour emphasis by emphasis of high frequency components is not carried out by the enhancer 62c. It is to be noted that the control section 64 controls the chroma decoder 62a, DRC portion 62b, panel driver 62d and backlight 63b similarly as in the ordinary dynamic picture process described hereinabove.

In this manner, where the received image data relate to a text content, by controlling the enhancer 62c so that contour emphasis is not carried out, such a situation that characters are made difficult to read by contour emphasis can be prevented.

On the other hand, if CT0=0 is not satisfied at step ST5, then the control section 64 recognizes that the received image data relate to a photograph content, and carries out a photograph (Photograph) process at step ST7. In this instance, the control section 64 controls operation of the chroma decoder 62a so that a color space for a still picture, for example, the Adobe RGB (trademark of Adobe) color space, may be selected by the chroma decoder 62a. It is to be noted that the control section 64 controls the DRC portion 62b, enhancer 62c, panel driver 62d and backlight 63b similarly as in the ordinary dynamic picture process described hereinabove.

In this manner, where the received image data relate to a photograph content, if the enhancer 62c sets the color space to a color space for a still picture, then an image based on image data of a photograph (still picture) content can be displayed favorably using the still picture color space.

On the other hand, if CT1=0 is not satisfied at step ST4, then the control section 64 decides at step ST8 whether or not CT0=0 is satisfied.

If CT0=0 is satisfied, then the control section 64 recognizes that the received image data relate to a cinema content and carries out a cinema (Cinema) process at step ST9. In this instance, the control section 64 controls the gamma correction of the panel driver 62d to raise the gradation on the black side and controls the backlight 63b to lower the color temperature. It is to be noted that the control section controls the chroma decoder 62a, DRC portion 62b and enhancer 62c similarly as in the ordinary dynamic picture process described above.

In this manner, if the received image data relate to a cinema content, then the panel driver 62d raises the gradation of the black side and lowers the color temperature of the backlight 63b to make it possible to display an image conforming to the cinema content.

On the other hand, if CT0=0 is not satisfied at step ST8, then the control section 64 recognizes that the received image data relate to a game content and carries out a game (Game) process at step ST10. In this instance, the control section 64 controls operation of the DRC portion 62b so that an image improvement process may not be carried out by the DRC portion 62b. It is to be noted that the control section 64 controls the chroma decoder 62a, enhancer 62c, panel driver 62d and backlight 63b similarly as in the ordinary dynamic process described above.

In this manner, if the received image data relate to a game content, then since the DRC portion 62b is prevented from carrying out the picture quality improvement process, delay of an image with respect to sound by the picture quality improving process can be moderated, and occurrence of an unfamiliar feeling by the displacement between the sound and the image can be prevented.

Now, another example of a control process by the control section 64 of the display unit 42 wherein the content identification information is used where the content identification information is composed of 1-bit data (ITC) and 2-bit data (CT1 and CT0) as described hereinabove is described with reference to a flow chart of FIG. 10. In FIG. 10, steps corresponding to those of FIG. 9 are denoted by like reference characters.

The control section 64 starts the control process first at step ST1 and then advances the processing to step ST1a. At step ST1a, the control section 64 decides which one of the auto mode, video (dynamic picture) mode, photo (still picture) mode, text mode, cinema mode and game mode the set mode is.

Figure 11:
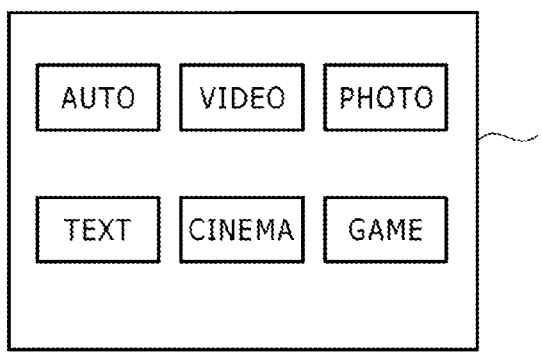
FIG. 11 is a view showing a GUI screen image displayed on a liquid crystal panel upon mode setting for an auto mode, a video (dynamic picture) mode, a photo (still picture) mode, a text mode, a cinema mode and a game mode.

It is to be noted that the control section 64 is provided in a user operation section not shown, and a user can operate the user operation section to carry out mode setting. FIG. 11 shows a GUI (Graphical User Interface) screen image displayed on the liquid crystal panel 63a upon mode setting. The user can set a desired mode by operating the user operation section to depress a button for the auto mode, video (dynamic picture) mode, photo (still picture) mode, text mode, cinema mode or game mode displayed on the GUI screen image.

If the set mode is the auto mode at step ST1a, then the control section 64 advances the processing to step ST2, at which it carries out a process similar to that in the flow chart described hereinabove with reference to FIG. 9 although detailed description of the same is omitted. On the other hand, if the set mode is one of the video, photo, text, cinema and game mode at step ST1a, then the control section 64 advances the processing to step ST1b. At step ST1b, the control section 64 carries out a process (dynamic picture process, text process, photograph process, cinema process or game process) corresponding to the set mode (refer to ST3, ST6, ST7, ST9 or ST10).

Figure 9:
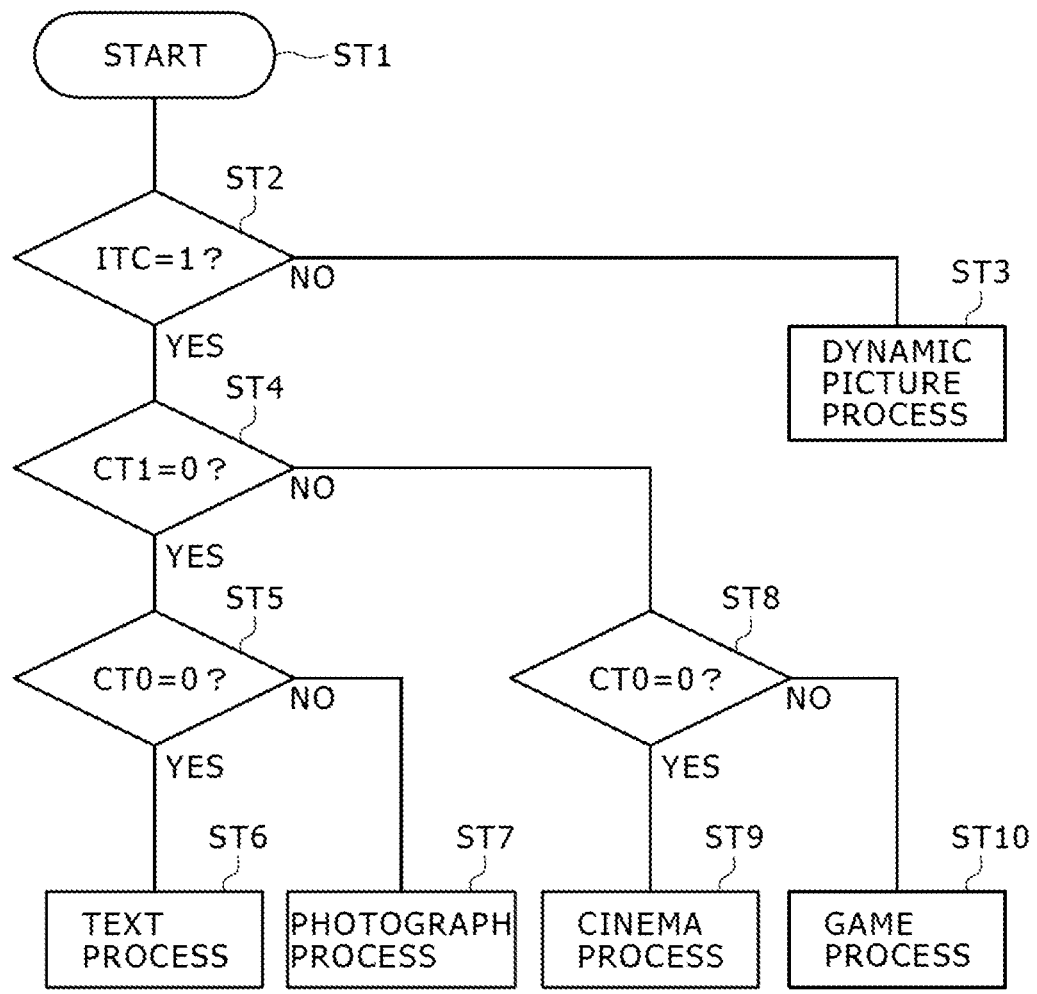
FIG. 9 is a flow chart illustrating an example of control based on content identification information on the reception side.
Figure 10:
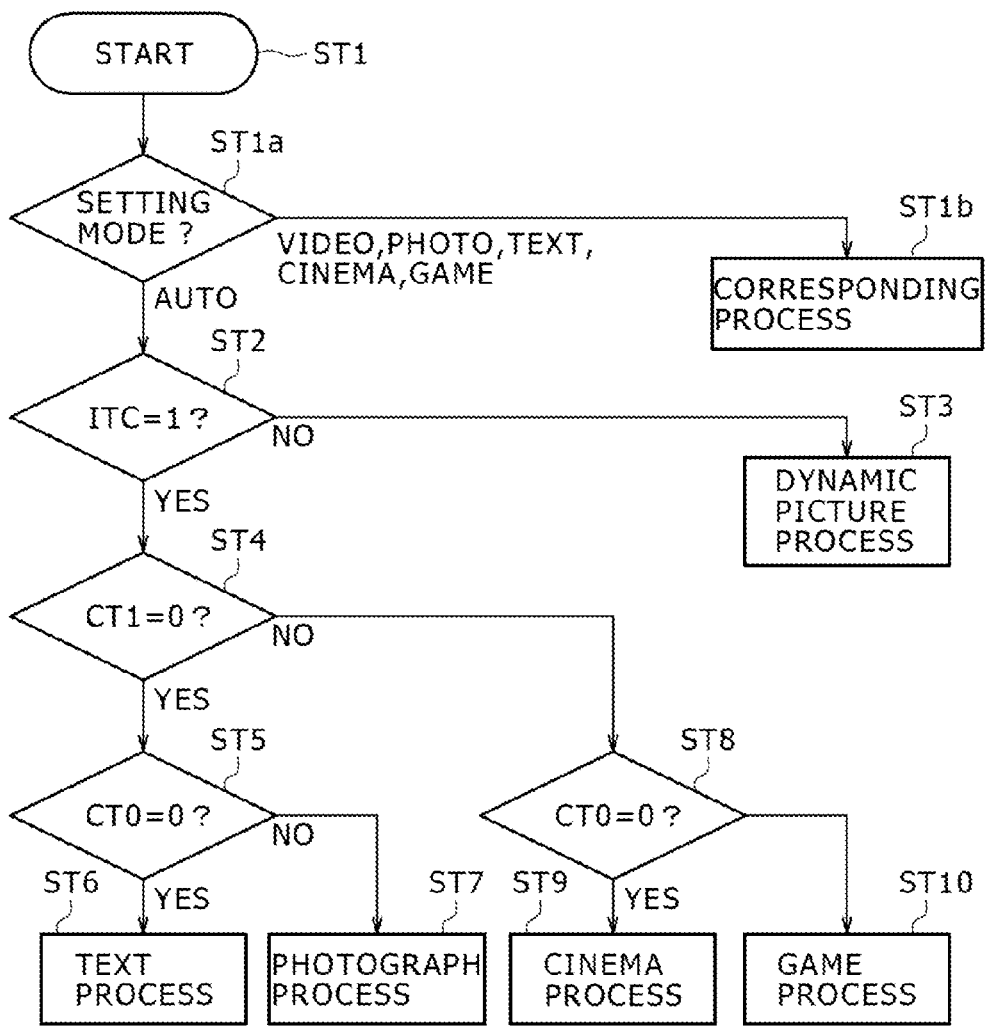
FIG. 10 is a flow chart illustrating another example of control based on content identification information on the reception side.

In the example of the control process illustrated in the flow chart of FIG. 10, where the set mode is the auto mode, similarly as in the example of the control process illustrated in the flow chart of FIG. 9, an optimum process depending upon the type of the content is carried out for the received image data (image signal). Further, in the example of the control process illustrated in the flow chart of FIG. 10, if the set mode is one of the video (dynamic picture), photo (still picture), text, cinema and game mode, then a process suitable for the set mode is carried out compulsorily for the received image data (image signal).

As described above, in the AV system 40 shown in FIG. 1, the HDMI source 53 of the HD recorder 41 inserts content identification information ITC, CT1 and CT0 into an AVI InfoFrame packet placed in a blanking period (data island interval) of image data and transmits the image data in the form of differential signals to the HDMI sink 61 of the display unit 42 through the three TMDS channels #0, #1 and #2. Accordingly, the display unit 42 can identify the content type of the received image data based on the content identification information and carry out an optimum process depending upon the content type for the image data.

Further, in the AV system 40 shown in FIG. 1, the content identification information inserted into a blanking period of image data by the HDMI source 53 of the HD recorder 41 is formed from the data ITC of 1 bit for the identification of whether or not the content is an ordinary dynamic picture content and the data CT1 and CT0 of 2 bits used when it is decided that the content is not a dynamic picture content. In this instance, if the transmission frequency of an ordinary dynamic picture content is high, then only the decision process of the content type in which the data ITC of 1 bit placed in the higher hierarchical layer is used is carried out frequently, and it becomes possible to moderate the load of the decision process by the control section 64 of the display unit 42.

It is to be noted that, in the embodiment described above, as the content identification information, the data ITC of 1 bit is placed in the higher hierarchical layer while the data CT1 and CT0 of 2 bits are placed in the lower hierarchical layer such that five different contents including an ordinary dynamic picture content, a text content, a photograph content, a cinema content and a game content can be identified. However, also it is possible to identify a greater number of different contents by increase of the number of data bits in each hierarchical layer, increase of the number of hierarchical layers and so forth. Further, the classification of five different contents of an ordinary dynamic picture content, a text content, a photograph content, a cinema content and a game content is an example, and is not limited to this.

Further, while, in the embodiment described above, it is described that the content identification information ITC, CT1 and CT0 is inserted into an AVI InfoFrame packet placed in a blanking period of image data, the content identification information may be inserted into another portion of a blanking period of image data.

Now, another embodiment of the present invention is described.

Figure 12:
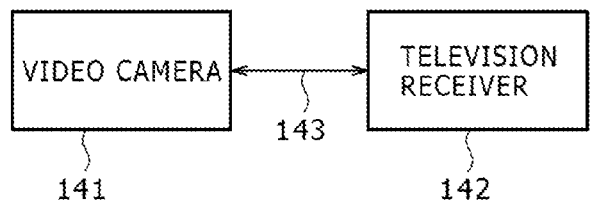
FIG. 12 is a block diagram showing an example of a configuration of an AV system as another embodiment.

FIG. 12 shows an example of a configuration of an AV system 140 to which the present invention is applied. Referring to FIG. 12, the AV system 140 is composed of a video camera 141 as a transmission apparatus, and a television receiver 142 as a reception apparatus. The video camera 141 and the television receiver 142 are connected to each other by a cable 143 for the HDMI.

Figure 13:
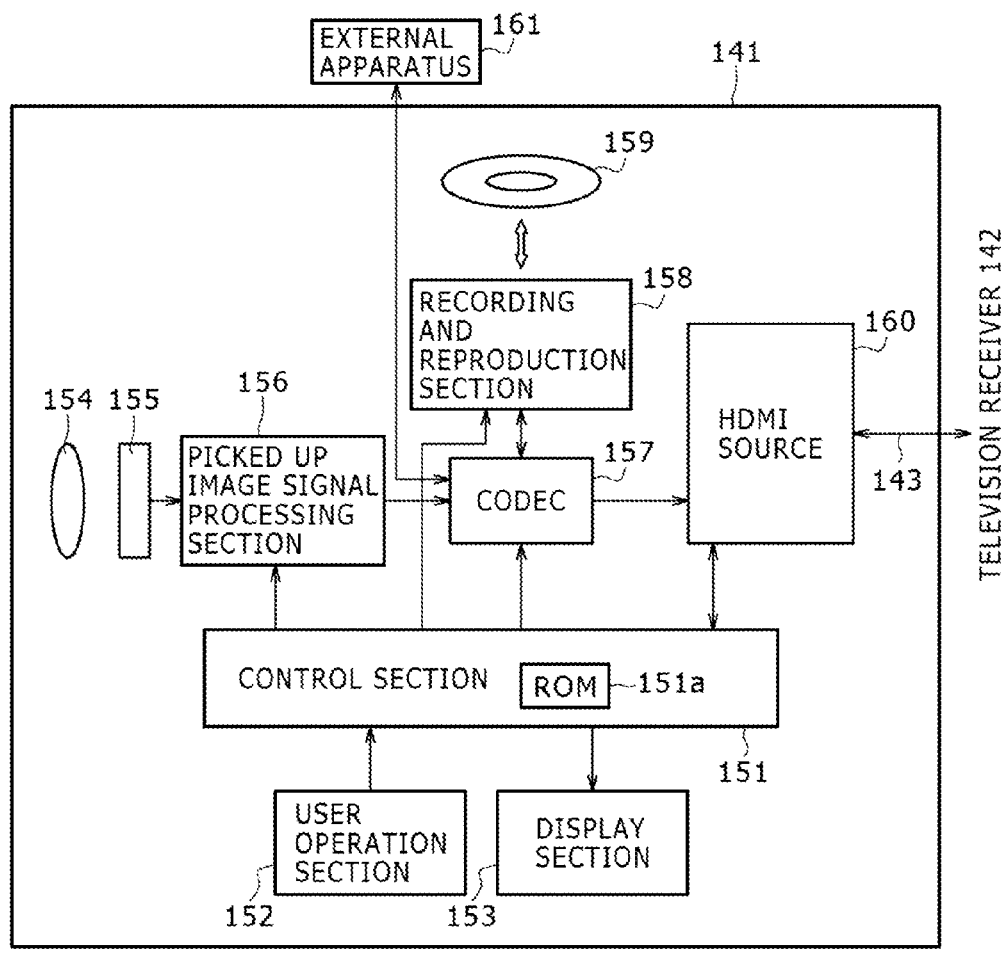
FIG. 13 is a block diagram showing an example of a configuration of a video camera which composes the AV system.

FIG. 13 shows an example of a configuration of the video camera 141. The video camera 141 has a control section 151, a user operation section 152, a display section 153, an image pickup lens 154, an image pickup element (image sensor) 155, a picked up image signal processing section 156, a codec 157, a recording and reproduction section 158 and an HDMI source 160.

The control section 151 controls operation of the components of the video camera 141. The user operation section 152 and the display section 153 form a user interface and are connected to the control section 151. The user operation section 152 is formed from keys, buttons and dials disposed on a housing not shown of the video camera 141, or a touch panel or the like disposed on the display face of the display section 153. The display section 153 is formed from an LCD (Liquid Crystal Display) unit or the like.

The image pickup element 155 is formed, for example, from a CCD (Charge Coupled Device) image sensor, a CMOS (Complementary Metal Oxide Semiconductor) image sensor or the like. The image pickup element 155 carries out an image pickup process in a state wherein an optical image of an image pickup object is formed on an image pickup plane by the image pickup lens 154 and outputs a picked up image signal.

The picked up image signal processing section 156 carries out, for a picked up image signal (analog signal) outputted from the image pickup element 155, sample hold and gain control, conversion from an analog signal into a digital signal, white balance adjustment, gamma correction and so forth to generate image data (image signal). It is to be noted that the user can designate a color space of image data to be outputted from the picked up image signal processing section 156 through the user operation section 152. In particular, the user can designate an RGB color space (for example, sRGB 601, sRGB 709, Adobe 601, Adobe 709 or the like) or a YUV color space (for example, sYCC 601, sYCC 709 or the like).

Further, the user can designate a quantization range for image data to be outputted from the picked up image signal processing section 156 through the user operation section 152. In particular, the user can designate a range for the luminance signal Y of image data in the YUV color space (for example, a full range (0 to 255), or a limited range (16 to 235)) or a range of quantization for color signals in the RGB color space (for example, a full range (0 to 255) or a limited range (16 to 235)).

The HDMI source 160 reads out the E-EDID of an HDMI sink 173 of the television receiver 142 hereinafter described from the HDMI sink 173 using the DDC through the HDMI cable 143. The E-EDID read out in the HDMI source 160 in this manner includes information of color spaces and quantization ranges which are supported by the television receiver 142, that is, can be handled by the television receiver 142. The control section 151 can control the display section 153 to display the color spaces and the quantization ranges supported by the television receiver 142 based on the information. In this instance, the user can simply designate any color space and any quantization range supported by the television receiver 142 by referring to the color spaces and the quantization ranges displayed on the display section 153.

It is to be noted that, in this instance, by making it possible for the user to designate a desired color space and a desired quantization range only from among color spaces and quantization ranges other than the color spaces and the quantization ranges displayed on the display section 153, it can be avoided that the user carries out designation of a color space which is not supported by the television receiver 142 on the reception side. Further, in place of such designation of a color space and a quantization range by the user as described above, the control section 151 may automatically select a predetermined color space and quantization range from among the color spaces and quantization ranges supported by the television receiver 142. In this instance, since a color space and a quantization range supported by the television receiver 142 on the reception side are automatically set, the labor of the user can be moderated. It is to be noted that, in this instance, the control section 151 forms a setting section for a color space and a quantization range.

FIG. 16 illustrates an example of a data structure of a color space data block (Colorimetry Data Block) as the E-EDID. In the fifth to seventh bits of the first byte, "Tag Code (07h)" representing that the data block is a data block of the type which uses an extended tag code (Extended Tag Code) is described. In the zeroth to fourth bits of the first byte, "Length of following data block (in bytes) (03h)" representative of a data block length is described. In the second byte, an extended tag code "Extended Tag Code (05h)" representing that the data block is a color space data block is described.

In the third byte and the fourth byte, substantial data are described. The zeroth bit (F30) of the third byte indicates whether or not a color space of "xvYCC 601" is supported. The first bit (F31) of the third byte indicates whether or not a color space of "xvYCC 709" is supported. The second bit (F32) of the third byte indicates whether or not a color space of "sYCC 601" is supported. The third bit (F33) of the third byte indicates whether or not a color space of "sYCC 709" is supported.

The fourth bit (F34) of the third byte indicates whether or not a color space of "Adobe 601" is supported. The fifth bit (F35) of the third byte indicates whether or not a color space of "Adobe 709" is supported. The sixth bit (F36) of the third byte indicates whether or not a color space of "Adobe RGB" is supported. Each of the bits indicates that the color space is supported, that is, the color space can be handled when it is "1."

FIG. 17 illustrates an example of a data structure of a video performance data block (Video Capability Data Block) as the E-EDID. In the fifth to seventh bits of the first byte, "Tag Code (07h)" representing that the data block is a data block of the type which uses an extended tag code (Extended Tag Code) is described. Further, in the zeroth to fourth bits of the first byte, "Length of following data block (in bytes) (02h)" representative of a data block length is described. In the second data block, an extended tag code "Extended Tag Code (00h)" representing that the data block is a video performance data block is described.

In the third byte, substantial data are described. The seventh bit (F37) of the third byte describes data QY of whether or not the full range can be handled in the YUV space. When QY=1, this represents that the full range is supported, that is, can be handled.

Figure 18:
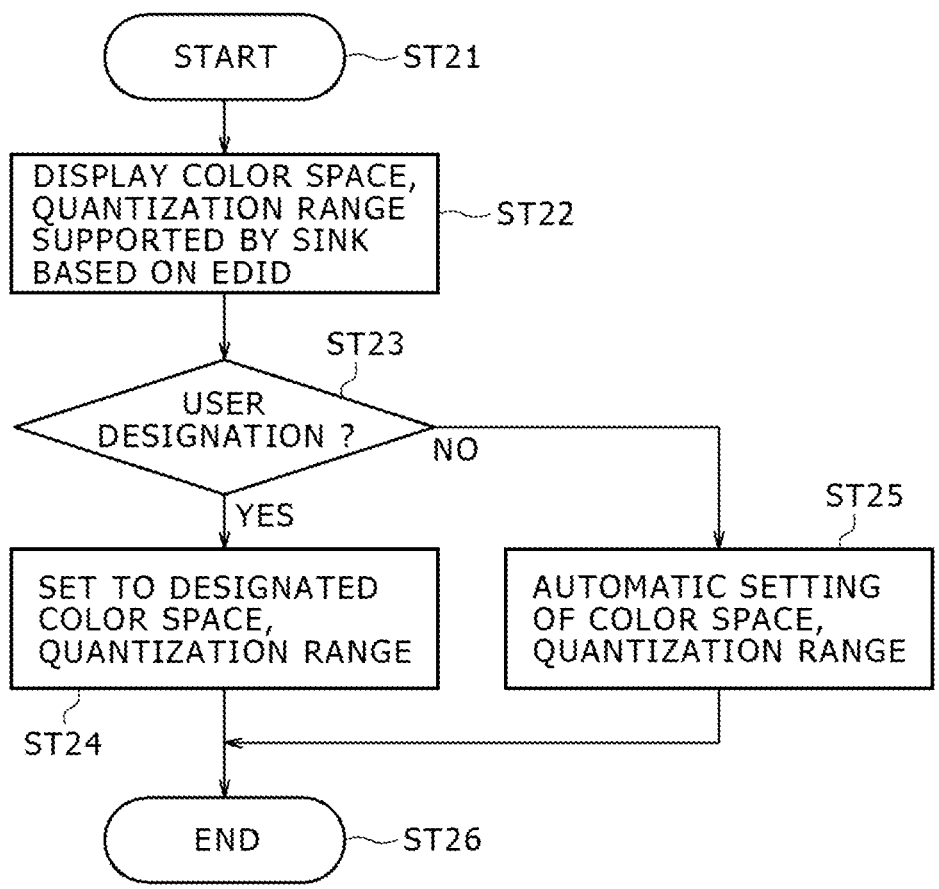
FIG. 18 is a flow chart illustrating an example of a setting process of a control section of a video camera upon setting of a color space and a quantization range.

A flow chart of FIG. 18 illustrates an example of a setting process of the control section 151 upon setting of a color space and a quantization range.

The control section 151 starts the setting process first at step ST21 and then advances the processing to step ST22. At step ST22, the control section 151 displays color spaces and quantization ranges supported by the television receiver (sink) 142 on the display section 153 based on information (EDID) of the color spaces and the quantization ranges obtained from the television receiver 142.

Then at step ST23, the control section 151 decides whether or not the user has designated a color space and a quantization range. If the user has designated a color space and a quantization range through the user operation section 152, then the control section 151 sets, at step ST24, the color space and the quantization range for image data to be outputted from the picked up image signal processing section 156 to the designated color space and quantization range. Thereafter, the control section 151 ends the setting process at step ST26.

If the user has not designated a color space or a quantization range at step ST23 described above, then the control section 151 automatically sets the color space and the quantization range to a predetermined color space and a predetermined quantization range from among the color spaces and the quantization ranges supported by the television receiver 142 at step ST25. Thereafter, the control section 151 ends the setting process at step ST26.

Referring back to FIG. 13, the recording and reproduction section 158 records encoded data obtained by encoding image data (image signal) and sound data (sound signal) associated with the image data, supplied from the codec 157, for example, by an MPEG (Moving Picture Experts Group) system or the like on the HD 159. Further, the recording and reproduction section 158 reproduces (reads out) the encoded data from the HD 159 and supplies the encoded data to the codec 157.

The codec 157 decodes encoded data supplied thereto from the recording and reproduction section 158 into data of an image and sound of the baseband (in a non-compressed state) in accordance with an MPEG system or the like and supplies the baseband image and sound data to the HDMI source 160 and an external apparatus 161. Further, the codec 157 encodes data of an image and sound of the baseband supplied from the picked up image signal processing section 156 or the external apparatus 161 into encoded data and supplies the encoded data to the recording and reproduction section 158. Here, the external apparatus 161 is an HD recorder, a personal computer, a DVD (Digital Versatile Disc) player, a video camera or the like.

The HDMI source 160 transmits data of an image and sound of the baseband supplied thereto unidirectionally from the codec 157 to the television receiver 142 through the HDMI cable 143 by communication complying with the HDMI. In this significance, the HDMI source 160 forms a transmission section. Further, the HDMI source 160 inserts content identification information for the identification of the content type of image data to be transmitted, that is, for the identification of to what content the image data relates, within a blanking period of the image data (image signal) to be transmitted. In this significance, the HDMI source 160 forms an identification information insertion section. Although detailed description is omitted, the HDMI source 160 is formed similarly to the HDMI source 53 of the HD recorder 41 of the AV system 40 of FIG. 1 described hereinabove.

Further, the HDMI source 160 inserts color space information representative of a color space for image data to be transmitted within a blanking period of image data (image signal) to be transmitted and inserts quantization range information representative of a quantization range for the image data to be transmitted within a blanking period of the image data (image signal) to be transmitted. In this significance, the HDMI source 160 forms a color space information insertion section and a quantization range information insertion section. Details of the content information, color space information and quantization range information are hereinafter described.

Figure 14:
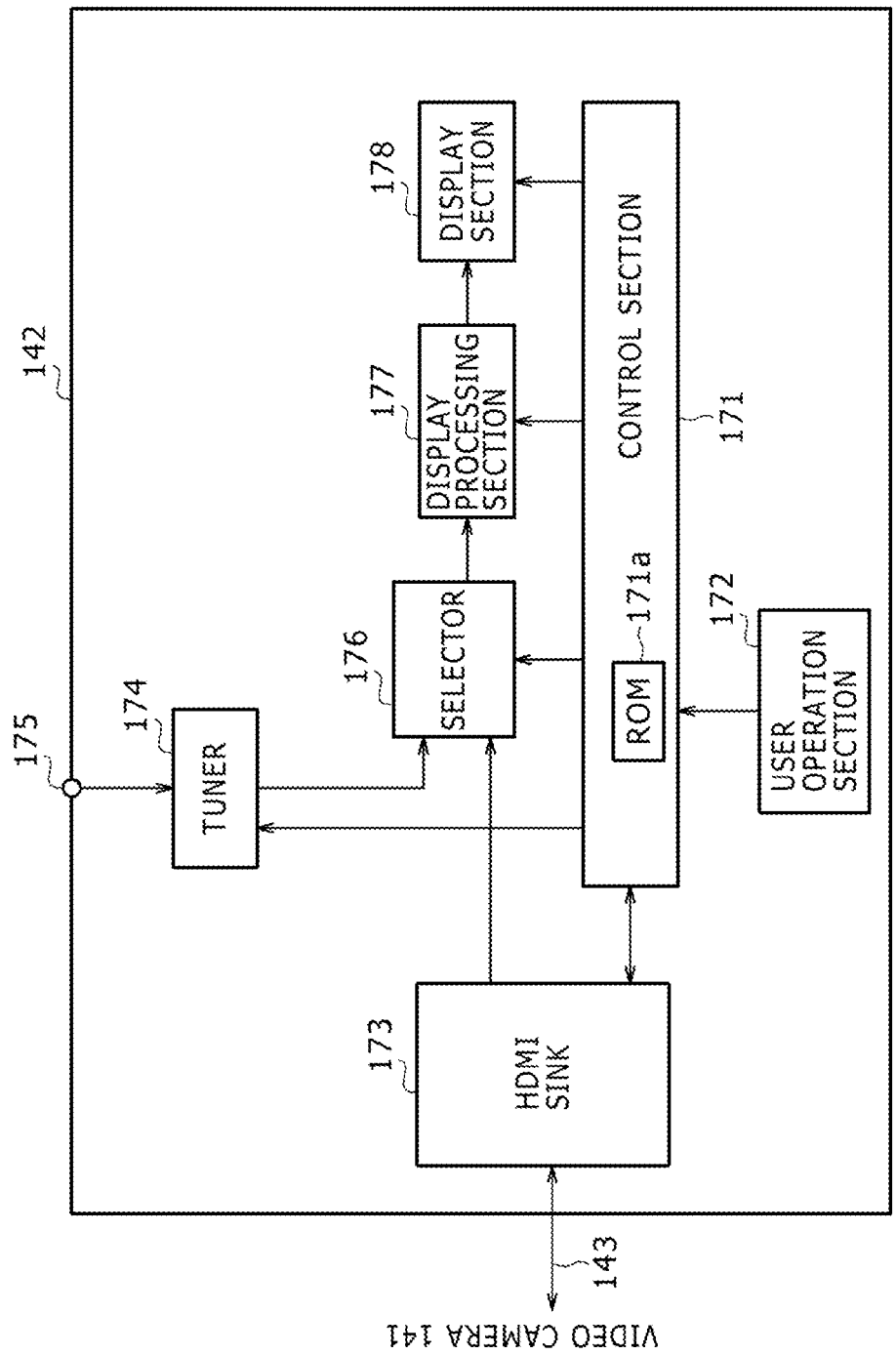
FIG. 14 is a block diagram showing an example of a configuration of a television receiver which composes the AV system.

FIG. 14 shows an example of a configuration of the television receiver 142. The television receiver 142 has a control section 171, a user operation section 172, an HDMI sink 173, a tuner 174, an antenna terminal 175, a switch 176, a display processing section 177 and a display section 178.

The control section 171 controls operation of the components of the television receiver 142. The user operation section 172 forms a user interface and is connected to the control section 171. The user operation section 172 is formed from keys, buttons and dials disposed on a housing not shown of the television receiver 142 or a remote controller or the like.

The HDMI sink 173 receives data of an image and sound of the baseband transmitted unidirectionally from the HDMI source 160 of the video camera 141 connected thereto through the HDMI cable 143 by communication complying with the HDMI. In this significance, the HDMI sink 173 forms a reception section. Although detailed description is omitted, the HDMI sink 173 is configured similarly to the HDMI sink 61 of the display unit 42 of the AV system 40 of FIG. 1 described hereinabove.

The HDMI sink 173 supplies received image data to the switch 176. It is to be noted that data of sound received by the HDMI sink 173 are supplied to a switch for sound data.

The tuner 174 receives BS broadcasting, terrestrial digital broadcasting and so forth. To this tuner 174, a broadcasting signal caught by an antenna not shown connected to the antenna terminal 175 is supplied. The switch 176 selectively takes out image data received by the HDMI sink 173 or image data received by the tuner 174.

The display processing section 177 carries out a process for contour emphasis for display or the like for image data taken out by the switch 176. The display section 178 displays an image based on image data processed by the display processing section 177. The display section 178 is formed, for example, from an LCD (Liquid Crystal Display) unit, an organic EL (ElectroLuminescence) unit, a PDP (Plasma Display Panel), a CRT (Cathode Ray Tube) or the like.

In the present embodiment, to the control section 171, content identification information, color space information and quantization range information inserted in a blanking period of image data are supplied from the HDMI sink 173 as described above. The control section 171 controls operation of the display processing section 177 and the display section 178 based on the information when image data received by the HDMI sink 173 is to be selected by the switch 176.

Figure 15:
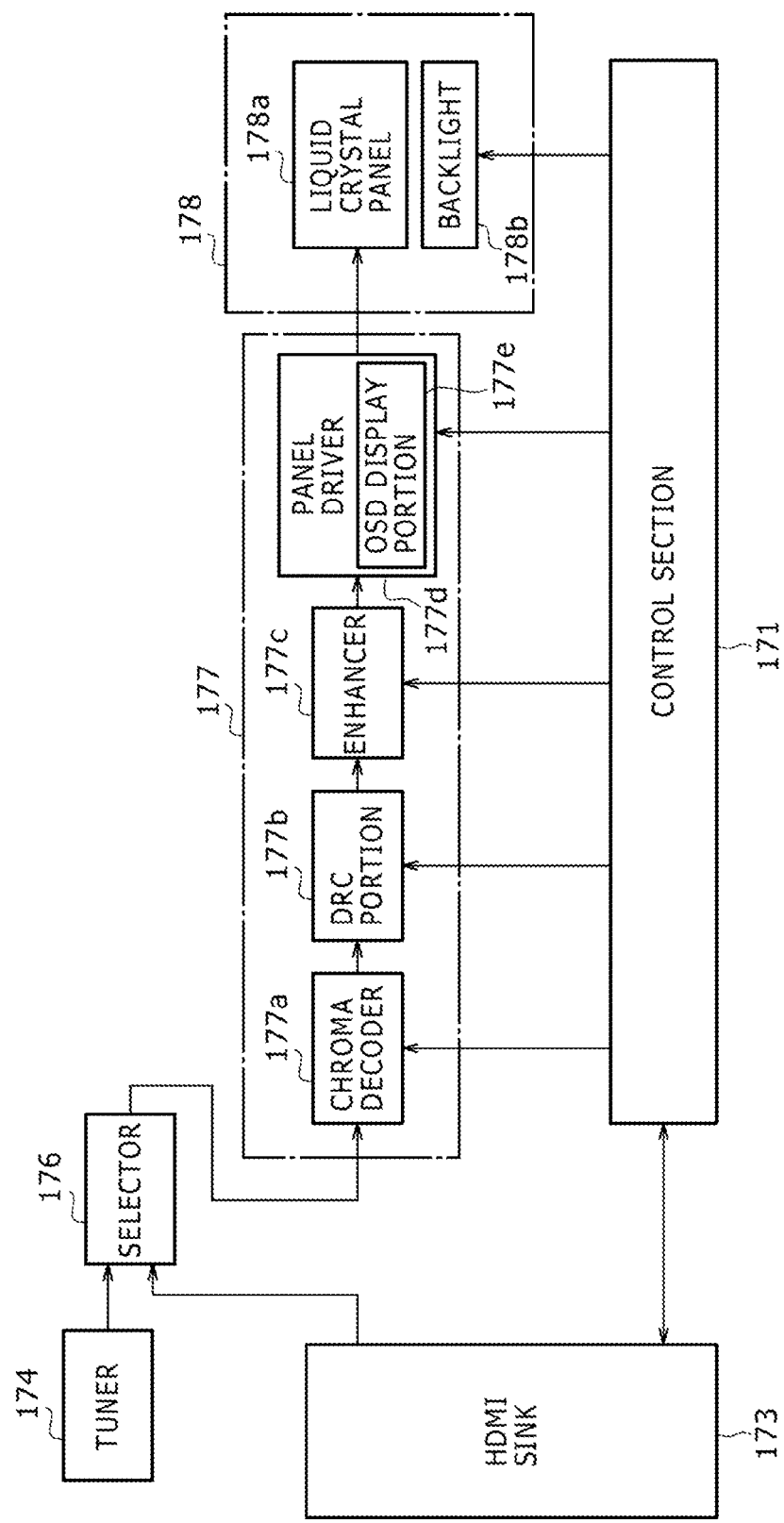
FIG. 15 is a block diagram showing an example of a particular configuration of a display processing section and a display section of the television receiver.

FIG. 15 shows an example of a particular configuration of the display processing section 177 and the display section 178. Referring to FIG. 15, the display processing section 177 is composed of a chroma decoder 177a, a DRC (Digital Reality Creation) portion 177b, an enhancer 177c and a panel driver 177d.

The chroma decoder 177a carries out a process regarding a color such as changing of a color space based on color space information or the like for image data supplied thereto from the HDMI sink 173. The chroma decoder 177a forms a color space changing section. The DRC portion 177b carries out a process for improving the picture quality for image data outputted from the chroma decoder 177a. In this instance, the DRC portion 177b regenerates, for example, pixel data of a pixel of interest in accordance with a pattern including peripheral pixel data to carry out the pixel quality improvement. The DRC portion 177b forms a picture quality improvement section.

The enhancer 177c carries out a process for contour emphasis for image data outputted from the DRC portion 177b. Further, the enhancer 177c carries out a process of expanding a color gamut when the color space of the image data is an sRGB color space. The enhancer 177c forms a contour emphasis section and a color gamut expansion section. The panel driver 177d drives a liquid crystal panel 178a, which forms a display section 178 hereinafter described, based on image data outputted from the enhancer 177c. In this instance, the panel driver 177d refers to information of the quantization range to generate a driving signal. The panel driver 177d carries out also gamma correction. The panel driver 177d forms a gradation changing section.

Further, referring to FIG. 15, the display section 178 is composed of a liquid crystal panel 178a and a backlight 178b. The liquid crystal panel 178a is driven by the above-described panel driver 177d to display an image based on image data. The backlight 178b is formed, for example, from a white fluorescent lamp.

An example of operation of the AV system 140 of FIG. 12 (FIGS. 13 and 14) configured in such a manner as described above is described.

For example, if the user operates the video camera 141 so as to pick up an image of an image pickup object, then the image pickup element 155 starts an image pickup operation, and picked up image data corresponding to the image pickup object are obtained from the picked up image signal processing section 156. The color space and the quantization range of the image data are a color space and a quantization range designated by the user in advance or automatically set by the control section 151.

The image data outputted from the picked up image signal processing section 156 are encoded by the codec 157 together with sound data, and the encoded data are recorded on the HD 159 by the recording and reproduction section 158.

On the other hand, for example, if the user operates the video camera 141 so as to record data from the external apparatus 161, then data of an image and sound from the external apparatus 161 are encoded by the codec 157, and the encoded data are recorded on the HD 159 by the recording and reproduction section 158.

If the user operates the video camera 141 so as to transmit data recorded on the HD 159, then encoded data are reproduced from the HD 159 by the recording and reproduction section 158 and supplied to the codec 157. The codec 157 decodes the encoded data reproduced by the recording and reproduction section 158 into data of an image and sound of the baseband, and the baseband image and sound data are supplied to the HDMI source 160.

On the other hand, if the user operates the video camera 141 so as to transmit picked up image data, then the image data outputted from the picked up image signal processing section 156 as described hereinabove and sound data corresponding to the image data are supplied to the HDMI source 160 past the codec 157 while remaining in the baseband data.

The HDMI source 160 inserts content identification information, color space information, quantization range information and so forth into a blanking period of the image data supplied from the codec 157. Then, the HDMI source 160 transmits the image data of the baseband, which has the content identification information, color space information, quantization range information and so forth inserted in the blanking period thereof, together with the sound data of the baseband supplied from the codec 157 unidirectionally to the television receiver 142 through the HDMI cable 143 by communication complying with the HDMI.

In the television receiver 142, the HDMI sink 173 receives the baseband image and sound data transmitted unidirectionally from the HDMI source 160 of the video camera 141 through the HDMI cable 143 by communication complying with the HDMI. The HDMI sink 173 supplies the received image data to the switch 176 and supplies the received sound data to the switch for sound data not shown. Further, the HDMI sink 173 supplies a control signal inserted in the blanking period of the image data, for example, the content identification information, color space information, quantization range information and so forth, to the control section 171.

Further, the image data received by the tuner 174 are supplied to the switch 176. When the user carries out an operation to select the HDMI sink 173 through the user operation section 172, the switch 176 takes out the image data received by the HDMI sink 173. On the other hand, when the user carries out another operation to select the tuner 174 through the user operation section 172, the switch 176 takes out the image data received by the tuner 174.

The image data taken out by the switch 176 are supplied to the display processing section 177. The display processing section 177 carries out a process suitable for the content type of the image data for the image data under the control of the control section 171, and the image data after the process are supplied to the display section 178. The display section 178 displays an image based on the image data supplied thereto from the display processing section 177.

Meanwhile, the sound data received by the tuner 174 are supplied to the switch for sound data. The switch for sound data carries out switching of sound data corresponding to the switching of the image data by the switch 176 described above. Then, the sound data taken out by the switch for sound data are supplied to the speaker not shown, from which sound based on the sound data is outputted.

Now, the content identification information, color space information and quantization range information inserted into a blanking period of image data (image signal) by the HDMI source 160 of the video camera 141 in such a manner as described above are described.

FIG. 19 illustrates a data structure of an AVI (Auxiliary Video Information) InfoFrame packet placed in a data island interval described hereinabove. According to the HDMI, associated information regarding an image can be transmitted from a source apparatus to a sink apparatus using the AVI InfoFrame packet.

In the present embodiment, the content identification information is disposed hierarchically into 1 bit of the CA (corresponding to the ITC of FIG. 7) at the sixth byte (Data Byte 3) of the AVI InfoFrame packet and 2 bits of the CT1 and CT0 at the eighth byte (Data Byte 5) as seen in FIG. 19.

The CA which is the data of 1 bit identifies whether or not the content is a dynamic picture content. Here, when CA=0, this represents that the content is an ordinary dynamic picture content, but when CA=1, this represents that the content is not an ordinary dynamic picture content. The CT1 and CT0 which are the data of 2 bits are effective (Active) when CA=1. In other words, when it is decided based on the CA that the content is not an ordinary dynamic picture content, the CT1 and the CT0 are user further.

In the present embodiment, four contents of a text content, a photograph content, a cinema content and a game content can be identified based on the CT1 and the CT0 as illustrated in FIG. 8. In particular, when CT1=0 and CT0=0, they indicate a text content. When CT1=0 and CT0=1, they indicate a photograph (still picture) content. When CT1=1 and CT0=0, they indicate a cinema content. When CT1=1 and CT0=1, they indicate a game content.

Here, the text content signifies a popular IT (Information Technology) content. The photograph content signifies a content of a still picture. The cinema content signifies a content of a cinema or a home video. The game content signifies a content of a PC or a game console video.

The color space information is disposed in 2 bits of Y1 and Y0 of the fourth byte (Data Byte 1), 2 bits of C1 and C0 of the fifth byte (Data Byte 2) and 3 bits of EC2, EC1 and EC0 of the sixth byte (Data Byte 3) of the AVI InfoFrame packet as seen in FIG. 19. In the present embodiment, the definition of the color space information "Y1, Y0. C1, C0, EC2, EC1, EC0" varies depending upon the type of the content, for example, upon whether or not the content is a still picture.

Meanwhile, the quantization range information is disposed in 2 bits of Q1 and Q0 of the sixth byte (Data Byte 3) and 2 bits of Q3 and Q2 of the eighth byte (Data Byte 5) as illustrated in FIG. 19. The Q1 and the Q0 represent the quantization range of the RGB color space. When Q1=0 and Q0=0, they indicate a default (Default), and when Q1=0 and Q0=1, they indicate a limited range. Further, when Q1=1 and Q0=0, they indicate a full range. The Q3 and the Q2 represent the quantization range of the YUV. In the present embodiment, the definition of the quantization range information "Q3, Q2" varies depending upon the type of the content, for example, upon whether or not the content is a still picture.

FIG. 20 illustrates the definition of the color space information and the quantization range information in the present embodiment. This definition example is an example which varies depending upon whether or not the content is a still picture.

The Y1 and the Y0 are described. Where the content is any other than a still picture, when Y1=0 and Y0=0, they indicate "RGB (sRGB)"; when Y1=0 and Y0=1, they indicate "YUV 4:2:2"; and when Y1=1 and Y0=0, they indicate "YUV 4:4:4." Meanwhile, where the content is a still picture (Photo), when Y1=0 and Y0=0, they represent "RGB (sRGB)"; when Y1=0 and Y0=1, they indicate "YUV 4:2:2"; when Y1=1 and Y0=0, they indicate "YUV 4:4:4"; and when Y1=1 and Y0=1, they indicate "RGB (Adobe)."

The C1 and the C0 are described. Whichever one of a still picture and any other than a still picture the content is, when C1=0 and C0=0, they indicate "No Data"; when C1=0 and C0=1, they indicate "sRGB 601"; when C1=1 and C0=0, they indicate "sRGB 709"; and when C1=1 and C0=1, they indicate "EC2 to EC0."

The EC2, EC1 and EC0 are described. Where the content is any other than a still picture, when EC2=0, EC1=0 and EC0=0, they indicate "sYCC 601," and when EC2=0, EC1=0 and EC0=1, they indicate "sYCC 709." On the other hand, where the content is a still picture, when EC2=0, EC1=0 and EC0=0, they indicate "sYCC 601"; when EC2=0, EC1=0 and EC0=1, they indicate "sYCC 709"; when EC2=0, EC1=1 and EC0=0, they indicate "Adobe 601"; and when EC2=0, EC1=1 and EC0=1, they indicate "Adobe 709."

The Q3 and the Q2 are described. Where the content is any other than a still picture, no definition is given. On the other hand, where the content is a still picture (Photo), when Q3=0 and Q2=0, they represent "Default"; when Q3=0 and Q2=1, they represent "limited range"; and when Q3=1 and Q2=0, they represent "full range."

The definitions of the color space information and the quantization range information illustrated in FIG. 20 are stored in a ROM 151a built in the control section 151 of the video camera 141, and are referred to when the color space information and the quantization range information are inserted into image data to be transmitted by the HDMI source 160. Further, the definitions of the color space information and the quantization range information illustrated in FIG. 20 are stored in a ROM 171a built in the control section 171 of the television receiver 142, and are referred to when the color space information and the quantization range information inserted in the image data received by the HDMI sink 173 are interpreted.

Now, an example of a control process wherein content identification information, color space information, quantization range information and so forth are used by the control section 171 of the television receiver 142 where the content identification information is composed of 1-bit data (CA) and 2-bit data (CT1 and CT0) as described hereinabove is described with reference to a flow chart of FIG. 21.

The control section 171 starts the control process first at step ST11 and then advances the processing to step ST12. At step ST12, the control section 171 decides whether or not ITC=1 is satisfied. If ITC=1 is not satisfied, then the control section 171 recognizes that the received image data relate to an ordinary dynamic picture content and carries out an ordinary dynamic picture process at step ST13.

In particular, the control section 171 controls the chroma decoder 177a so that a color space where the color space information is interpreted by the definition of the dynamic picture may be obtained. Further, the control section 171 controls the DRC portion 177b so as to carry out a picture quality improvement process. Further, the control section 171 controls the enhancer 177c so as to emphasize high frequency components to carry out contour emphasis and carry out a process of expanding the color gamut when the color space is the sRGB. Further, the control section 171 controls the panel driver 177d so as to generate a driving signal within the quantization range where the quantization range information is interpreted with the definition of the dynamic picture and carry out ordinary gamma correction. Further, the control section 171 controls the backlight 178b so that an ordinary color temperature is established.

When ITC=1 is satisfied at step ST12, the control section 171 advances the processing to step ST14. At step ST14, the control section 171 decides whether or not CT1=0 is satisfied. Then, if CT1=0 is satisfied, then the control section 171 decides whether or not CT0=0 is satisfied at step ST15.

When CT0=0 is satisfied, then the control section 171 recognizes that the received image data relate to a text content, and carries out a text (Text) process at step ST16. In this instance, the control section 171 controls operation of the enhancer 177c so that contour emphasis by emphasis of high frequency components by the enhancer 177c may not be carried out. It is to be noted that, in the other regards, the control section 171 carries out similar control to that in the ordinary dynamic picture process described hereinabove.

In this manner, where the received image data relate to a text content, by preventing the contour emphasis from being carried out by the enhancer 177c, such a situation that it becomes difficult to read characters by contour emphasis can be prevented.

On the other hand, if CT0=0 is not satisfied at step ST15, then the control section 171 recognizes that the received image data relate to a photograph content (content of a still picture), and carries out a photograph (Photograph) process at step ST17. In this instance, the control section 171 controls operation of the chroma decoder 177a so that a color space where the color space information is interpreted with the definition of a still picture may be established. Further, the control section 171 controls the panel driver 177d so that a driving signal is generated within a quantization range where the quantization range information is interpreted with the definition of a still picture. In regard to the other part, the control section 171 carries out control similarly as in the ordinary dynamic picture process described hereinabove.

Figure 22:
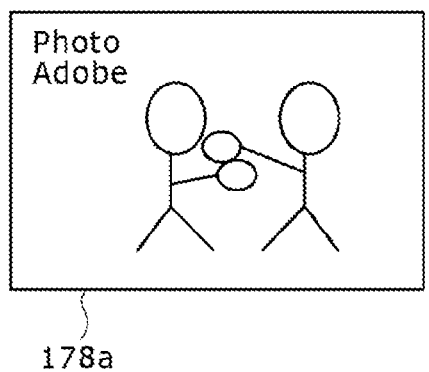
FIG. 22 is a view showing an example of display of a content and a color space OSD displayed on the screen of the liquid crystal panel.

It is to be noted that the panel driver 177d includes, though not described above, an OSD (On Screen Display) display portion 177e, and the control section 171 may control the OSD display portion 177e such that the types of the content and the color space are displayed, for example, as shown in FIG. 22, on the screen of the liquid crystal panel 178a. In the display example of FIG. 22, it is indicated by "Photo" that the type of the content is a still picture, and it is indicated that the type of the color space is "Adobe." Such OSD display of the type of a content and the type of a color space as just described may be applied not only to a still picture content but also to the other contents. The user can readily grasp the type of the content and the type of the color space from the OSD display.

In this manner, where the received image data relate to a photograph content, by causing the enhancer 177c to set the color space to a color space for a still picture, an image based on image data of a photograph (still picture) content can be displayed favorably through the color space for a still picture.

On the other hand, if CT1=0 is not satisfied at step ST14, then the control section 171 decides at step ST18 whether or not CT0=0 is satisfied.

If CT0=0 is satisfied, then the control section 171 recognizes that the received image data relate to a cinema content, and carries out a cinema (Cinema) process at step ST19. In this instance, the control section 171 controls the gamma correction by the panel driver 177d to raise the hierarchical layer of the black side and controls the backlight 178b to lower the color temperature. It is to be noted that, in the other regards, the control section 171 carries out similar control to that in the ordinary dynamic picture process described hereinabove.

In this manner, where the received image data relate to a cinema content, by raising the gradation on the black side by means of the panel driver 177d and lowering the color temperature of the backlight 178b, display of an image suitable for a cinema content can be carried out.

On the other hand, if CT0=0 is not satisfied at step ST18, then the control section 171 recognizes that the received image data relate to a game content, and carries out a game (Game) process at step ST20. In this instance, the control section 171 controls operation of the DRC portion 177b so that the DRC portion 177b may not carry out an image improvement process. It is to be noted that, in the other regards, the control section 171 carries out similar control to that in the ordinary dynamic picture process described hereinabove.

Figure 23:
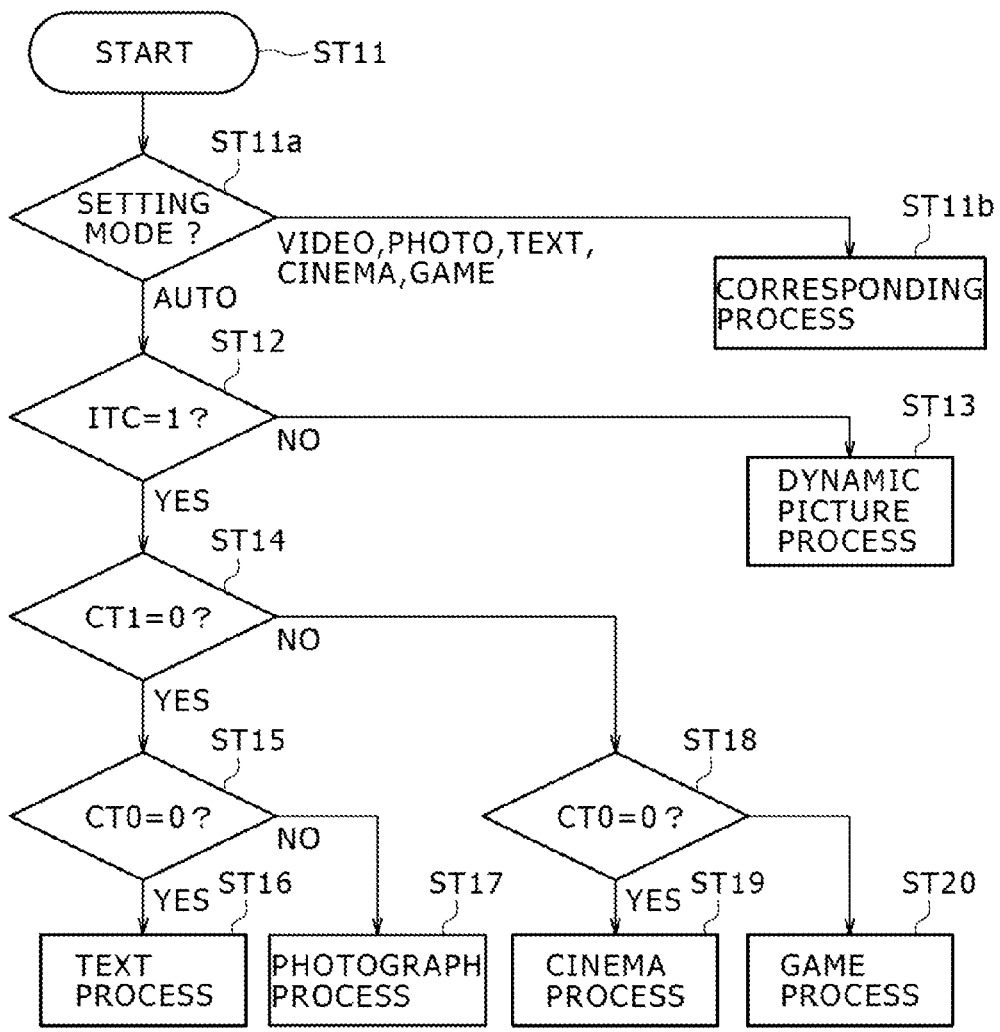
FIG. 23 is a flow chart illustrating another example of control on the reception side depending upon content identification information and so forth.

In this manner, where the received image data relate to a game content, by controlling the DRC portion 177b so that a picture quality improving process may not be carried out, delay of an image with respect to sound by the picture quality improving process can be moderated and occurrence of an unfamiliar feeling by displacement between the sound and the image can be prevented. Now, another example of a control process wherein content identification information, color space information, quantization range information and so forth are used by the control section 171 of the television receiver 142 where the content identification information is composed of 1-bit data (CA) and 2-bit data (CT1 and CT0) as described hereinabove is described with reference to a flow chart of FIG. 23. In FIG. 23, steps corresponding to those of FIG. 21 are denoted by like reference characters.

The control section 171 starts the control process first at step ST11 and then advances the processing to step ST11a. At step ST11a, the control section 171 decides which one of the auto, video (dynamic picture), photo (still picture), text, cinema and game modes the set mode is.

Figure 24:
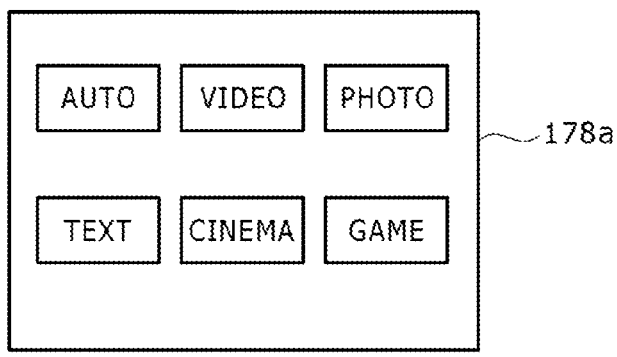
FIG. 24 is a view showing a GUI screen image displayed on the liquid crystal panel upon mode setting for an auto mode, a video (dynamic picture) mode, a photo (still picture) mode, a text mode, a cinema mode and a game mode.

The user can operate the user operation section 172 to carry out mode setting. FIG. 24 shows a GUI (Graphical User Interface) screen image displayed on the liquid crystal panel 178a. The user can set a desired mode by operating the user operation section 172 to depress auto, video (dynamic picture), photo (still picture), text, cinema and game buttons displayed on the GUI screen image.

Figure 21:
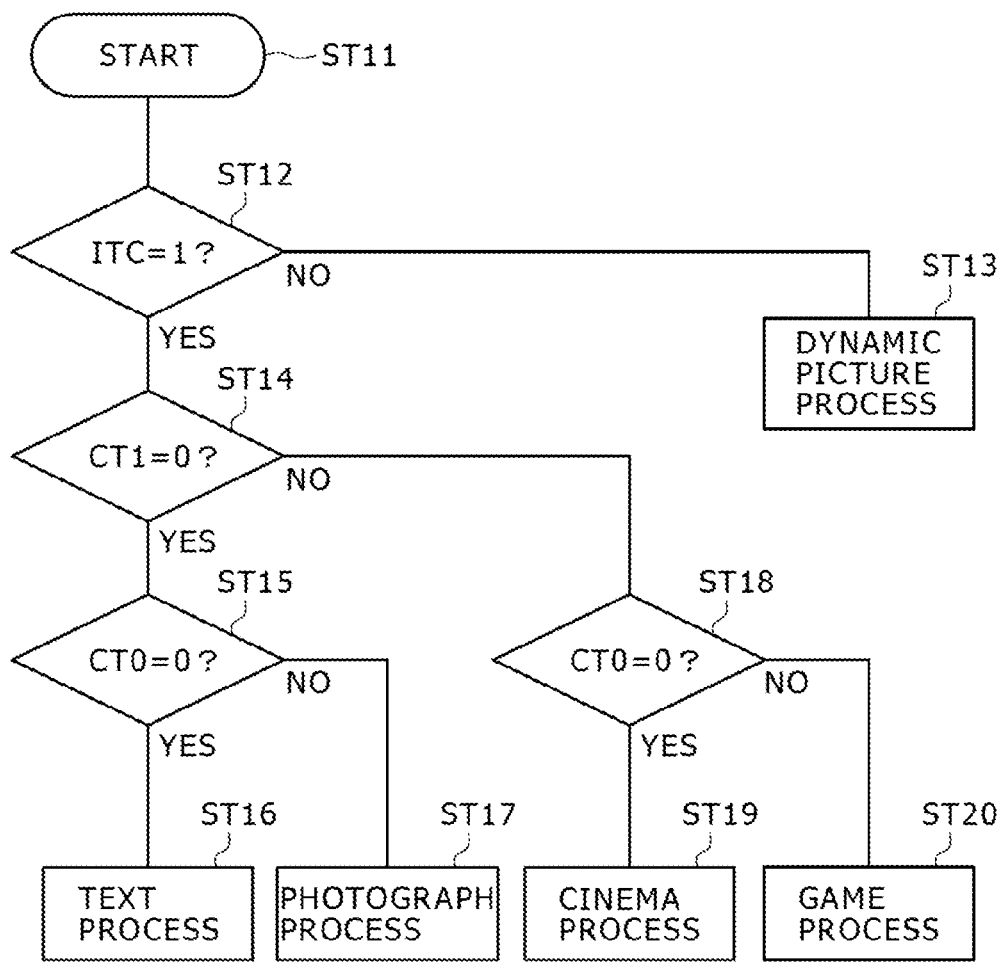
FIG. 21 is a flow chart illustrating an example of control on the reception side based on content identification information and so forth.

If the auto mode is set at step ST11a, then the control section 171 advances the processing to step ST12, at which it carries out a process similar to that of the flow chart of FIG. 21 although detailed description thereof is omitted. On the other hand, if one of the video, photo, text, cinema and game modes is set at step ST11a, then the control section 171 advances the processing to step ST11b. At step ST11b, the control section 171 carries out a process corresponding to the set mode (dynamic picture process, text process, photograph process, cinema process or game process) (refer to ST13, ST16, ST17, ST19 and ST20).

In the example of the control process illustrated in the flow chart of FIG. 23, if the set mode is the auto mode, then an optimum process depending upon the type of the content is carried out for the received image data (image signal) similarly as in the example of the control process illustrated in the flow chart of FIG. 21). It is to be noted that, in the example of the control process illustrated in the flow chart of FIG. 23, if the set mode is one of the video (dynamic picture), photo (still picture), text, cinema and game modes, a process corresponding to the set mode is carried out compulsorily for the received image data (image signal).

It is to be noted that, while, in the foregoing description, the control section 171 sets the color space to a color space indicated by the color space information (controls operation of the chroma decoder 177a so that a color space indicated by the color space information may be established), the user may carry out mode setting so that a predetermined color space may be established compulsorily.

Figure 25:
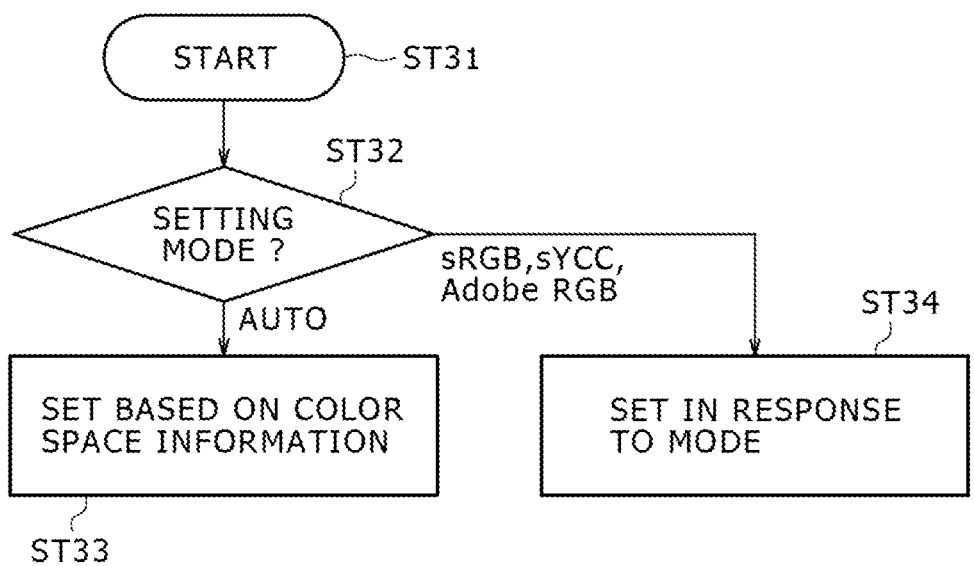
FIG. 25 is a flow chart illustrating an example of control on the reception side depending upon color space information.

A flow chart of FIG. 25 illustrates an example of a control process in this instance. The control section 171 starts the processing operation first at step ST31 and then advances the processing to step ST32. At step ST32, the control section 171 decides which one of the auto, sRGB, sYCC and Adobe RGB modes the set mode is.

Figure 26:
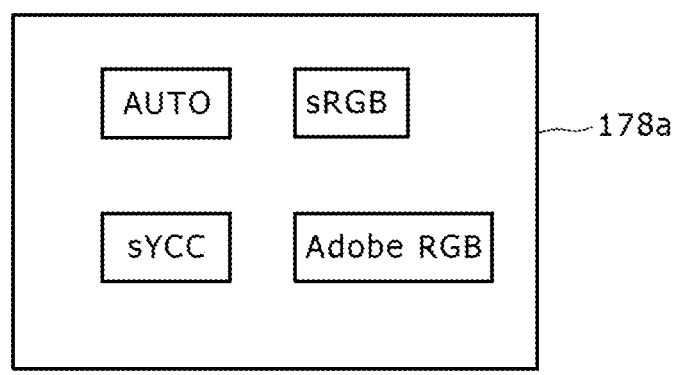
FIG. 26 is a view showing a GUI screen image displayed on the liquid crystal panel upon mode setting for an auto mode, an sRGB mode, an sYCC mode and an Adobe RGB mode.

The user can operate the user operation section 172 to carry out mode setting. FIG. 26 shows a GUI (Graphical User Interface) screen image displayed on the liquid crystal panel 178a upon mode setting. The user can set a desired mode by operating the user operation section 172 to depress one of auto, sRGB, sYCC and Adobe RGB buttons displayed on the GUI screen image.

If the set mode is the auto mode at step ST32, then the control section 171 advances the processing to step ST33, at which it controls operation of the chroma decoder 177a so that a color space indicated by the color space information may be established although detailed description is omitted. On the other hand, if the set mode is one of the sRGB, sYCC and Adobe RGB modes at step ST32, then the control section 171 advances the processing to step ST34. At step ST24, the control section 171 controls operation of the chroma decoder 177a so that a color space corresponding to the set mode may be established.

In the example of the control process illustrated in the flow chart of FIG. 25, if the set mode is the auto mode, then an optimum color space depending upon the received image data (image signal) is set. Further, in the example of the control process illustrated in the flow chart of FIG. 25, if the set mode is one of the sRGB, sYCC and Adobe RGB modes, then a color space suitable for the set mode is set compulsorily.

Further, in the foregoing description, the control section 171 sets the quantization range for the received image data (image signal) to the quantization range indicated by the quantization range information (controls the panel driver 177d so as to generate a driving signal within the quantization range indicated by the quantization range information). However, the control section 171 may be configured such that the user can compulsorily set a mode so as to set a predetermined quantization range.

Figure 27:
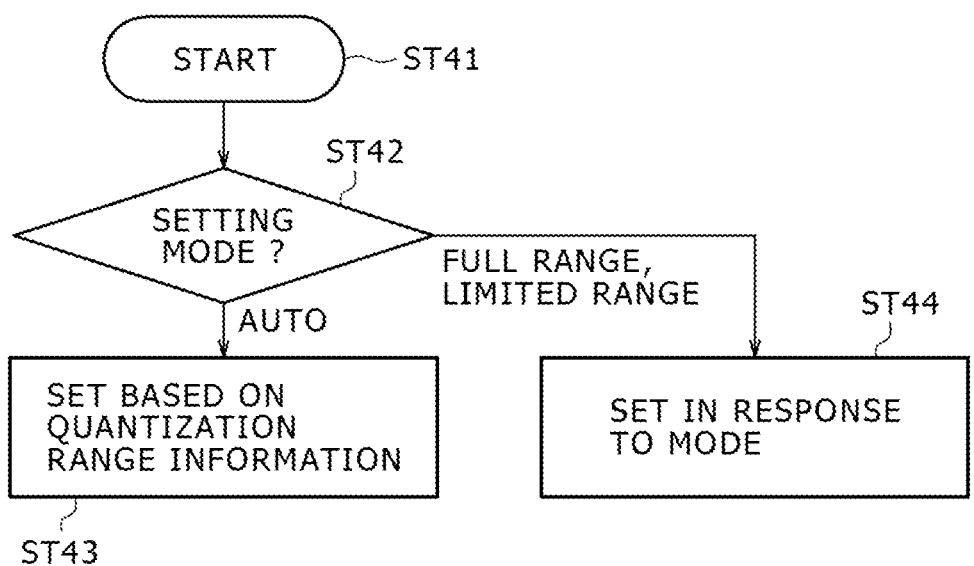
FIG. 27 is a flow chart illustrating an example of control on the reception side depending upon quantization range information.

A flow chart of FIG. 27 illustrates an example of a control process in this instance. The control section 171 first starts the processing operation at step ST41 and thereafter advances the processing to step ST42. At step ST42, the control section 171 decides which one of the auto, full range and limited range modes the set mode is.

Figure 28:
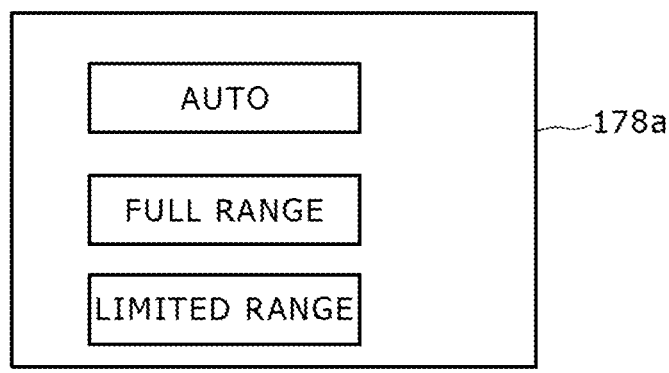
FIG. 28 is a view showing a GUI screen image displayed on the liquid crystal panel upon mode setting for an auto mode, a full range mode and a limited range mode.

The user can operate the user operation section 172 to carry out mode setting. FIG. 28 shows a GUI (Graphical User Interface) screen image displayed on the liquid crystal panel 178a upon mode setting. The user can operate the user operation section 172 to depress any of buttons for the auto, full range and limited range modes displayed on the GUI screen to set a desired mode.

If the set mode is the auto mode at step ST42, then the control section 171 advances the processing to step ST43, at which it controls operation of the panel driver 177d so that a driving signal is generated within a quantization range indicated by the quantization range information although detailed description is omitted. On the other hand, if the set mode is one of the full range and limited range modes at step ST42, then the control section 171 advances the processing to step ST44. At step ST44, the control section 171 controls operation of the panel driver 177d so that a driving signal is generated within the quantization range corresponding to the set mode.

In the example of the control process illustrated in the flow chart of FIG. 27, if the set mode is the auto mode, then an optimum quantization range corresponding to the received image data (image signal) is set. Further, in the example of the control process illustrated in the flow chart of FIG. 27, if the set mode is one of the full range and limited range modes, then a quantization range corresponding to the set mode is set compulsorily.

As described hereinabove, in the AV system 140 shown in FIG. 12 (FIGS. 13 and 14), the HDMI source 160 of the video camera 141 inserts content identification information CA, CT1 and CT0 into an AVI InfoFrame packet placed in a blanking period (data island interval) of the image data and transmits the image data in the form of differential signals to the HDMI sink 173 of the television receiver 142 through the three TMDS channels #0, #1 and #2. Accordingly, the television receiver 142 can identify the content type of the received image data based on the content identification information and can carry out an optimum process conforming to the content type for the image data.

Further, in the AV system 140 shown in FIG. 12 (FIGS. 13 and 14), the content identification information inserted into a blanking period of image data by the HDMI source 160 of the video camera 141 is composed of data CA of 1 bit for the identification of whether or not the content is an ordinary dynamic picture content, and data CT1 and CT0 of 2 bits which are used further when it is decided based on the data CA that the content is not a dynamic picture content. In this instance, if the transmission frequency of an ordinary dynamic picture content is high, then only the decision process of the content type in which the data CA of 1 bit placed in the higher hierarchical layer is used is carried out frequently, and it becomes possible to moderate the load of the decision process by the control section 171 of the television receiver 142.

Further, in the AV system 140 shown in FIG. 12 (FIGS. 13 and 14), the definitions of the color space information and the quantization range information inserted into a blanking period of the image data by the HDMI source 160 of the video camera 141 vary depending upon the type of the content, in the present embodiment, depending upon whether or not the content is a still picture. The television receiver 142 can display an image based on the image data in an optimum color space and an optimum gradation in accordance with the type of the content.

It is to be noted that, while, in the present embodiment described above, the definitions of the color space information and the quantization range information are varied depending upon whether or not the content is a still picture (refer to FIG. 20), it is a possible idea to define the color space information and the quantization range information more finely for each type of the content.

Further, though not described above, image data having a color space (known from color space information) which is not supported by the television receiver 142 may possibly be transmitted from the video camera 141 to the television receiver 142. For example, this is a case wherein a user can freely designate a color space on the video camera 141 or the like. In this instance, the control section 171 of the television receiver 142 may control the OSD display portion 177e built in the panel driver 177d such that it is OSD displayed on the liquid crystal panel 178a that the television receiver 142 does not support the color space for image data transmitted from the video camera 141. In this instance, the user can readily recognize based on the OSD display that image data having a color space which is not supported by the television receiver 142 has been sent to the television receiver 142 from the video camera 141.

Further, in the embodiment described above, in order to insert content identification information for the identification of the type of a content into a blanking period of an image signal of a predetermined content to be transmitted, the AVI InfoFrame of the HDMI is used. However, it is also a possible idea to use the SPD (Source Product Description) InfoFrame as described below.

Figures 30, 31:
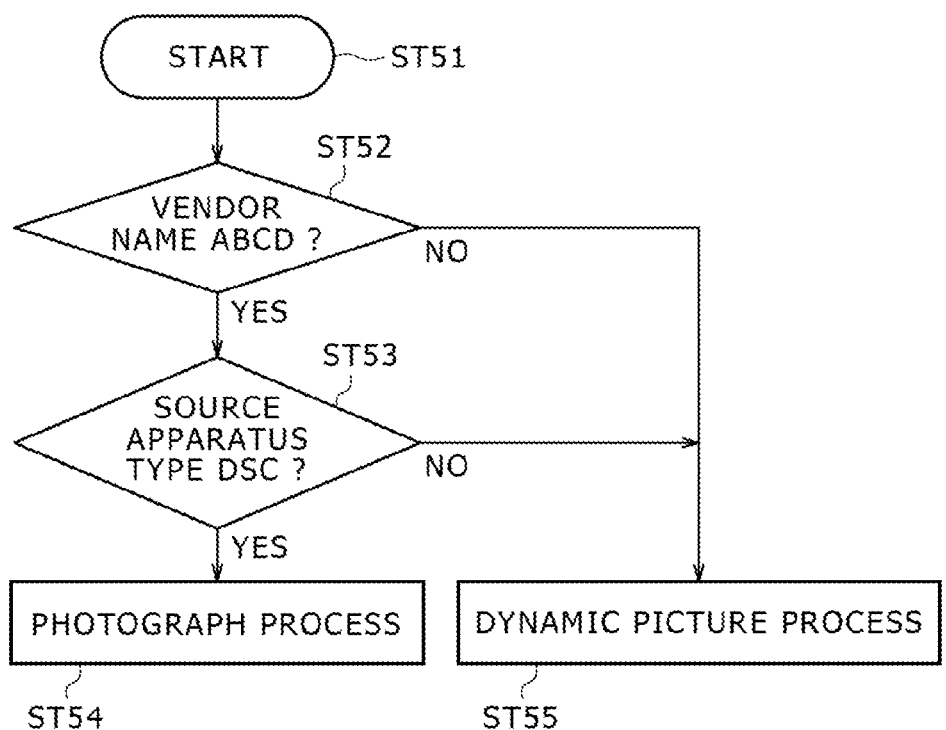
FIG. 30 is a view illustrating a configuration of Source, Device and Information.
FIG. 31 is a flow chart illustrating an example of control on the reception side depending upon content identification information.

FIG. 29 illustrates a configuration of the SPD InfoFrame. For example, the Data Byte 1 to Data Byte 8 are used as a Vendor name Character (vendor name) region, and vendor name information is placed using this region. Meanwhile, the Data Byte 9 to Data Byte 24 are used as a Product Descript Character (model number) region. Further, the Data Byte 25 is used as a Source. Device. Information (source apparatus type) region. In this source apparatus type region, a code indicative of a source apparatus type is placed as seen in FIG. 30. For example, when the source apparatus is a digital STB, "01h" is placed; when the source apparatus is a DVC (Digital Video Camera), "05h" is placed; and when the source apparatus is a DSC (Digital Still Camera), "06h" is placed.

For example, where a particular vendor name, for example, "ABCD" is described in the vendor name region and the code of "06h" representing that the source apparatus is a DSC (Digital Still Camera) is described in the source apparatus type region, it is indicated that the content is a still picture content, and in any other case, it is indicated that the content is a dynamic picture content. It is to be noted that the particular vendor name is not limited to a certain one vendor name, but may be one of a plurality of vendor names.

An example of a control process of the control section 171 of the television receiver 142 where content identification information is transmitted from a source apparatus to a sink apparatus using the SPD InfoFrame of the HDMI as described hereinabove is described with reference to a flow chart of FIG. 31.

The control section 171 starts the control process first at step ST51 and then advances the processing to step ST52. At step ST52, the control section 171 decides whether or not the vendor name described in the vendor name region of the SPD InfoFrame is "ABCD."

If the vendor name is "ABCD," then the control 171 decides at step ST53 whether or not the code indicative of the DSC is described in the source apparatus type region of the SPD InfoFrame. When the vendor name is not "ABCD" at step ST52 or when the code indicative of the DSC is not described at step ST53, the control section 171 carries out an ordinary dynamic picture process at step ST55.

In particular, the control section 171 controls the chroma decoder 177a so as to establish a color space where the color space information is interpreted with the definition of a dynamic picture. Further, the control section 171 controls the DRC portion 177b so as to carry out a picture quality improvement process. Further, the control section 171 controls the enhancer 177c to emphasize high frequency components to carry out contour emphasis and carry out, when the color space is the sRGB, a process of expanding the color gamut. Further, the control section 171 controls the panel driver 177d to generate a driving signal within a quantization range where the quantization range information is interpreted with the definition of a dynamic picture and carry out ordinary gamma correction. Further, the control section 171 controls the backlight 178b so as to establish an ordinary color temperature.

On the other hand, when the code indicative of the DSC is described at step ST53, the control section 171 carries out a photograph (Photograph) process at step ST54. In this instance, the control section 171 controls operation of the chroma decoder 177a so as to establish a color space where the color space information is interpreted with the definition of a still picture. Further, the control section 171 controls the panel driver 177d so as to generate a driving signal within a quantization range where the quantization range information is interpreted with the definition of a still picture. In the other regards, the control section 171 carries out similar control to that in the ordinary dynamic picture process described hereinabove.

Now, another example of a control process of the control section 171 of the television receiver 142 where content identification information is transmitted from a source apparatus to a sink apparatus using the SPD InfoFrame of the HDMI as described hereinabove is described with reference to a flow chart of FIG. 32.

The control section 171 starts the control process first at step ST51 and then advances the processing to step ST51a. At step ST51a, the control section 171 decides which one of the auto, video (dynamic picture) and photo (still picture) modes the set mode is.

Figure 33:
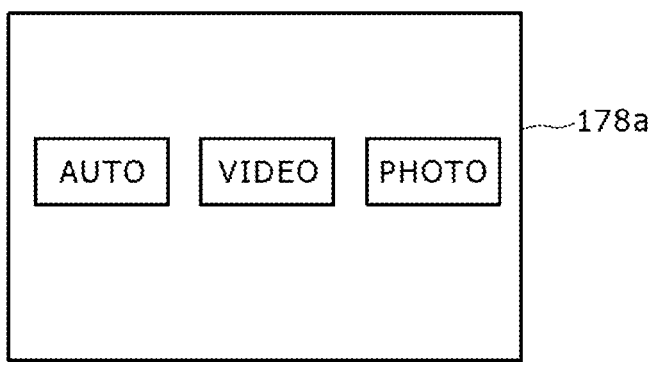
FIG. 33 is a view showing a GUI screen image displayed on the liquid crystal panel upon mode setting for an auto mode, a video (dynamic picture) mode and a photo (still picture) mode.

The user can operate the user operation section 172 to carry out mode setting. FIG. 33 shows a GUI (Graphical User Interface) screen image display on the liquid crystal panel 178a upon mode setting. The user can set a desired mode by operating the user operation section 172 to depress a button for the auto mode, video (dynamic picture) mode, photo (still picture) mode, text mode, cinema mode or game mode displayed on the GUI screen image.

If the auto mode is set at step ST51a, then the control section 171 advances the processing to step ST52, at which it carries out a process similar to that of the flow chart described hereinabove with reference to FIG. 31 although detailed description of the same is omitted. On the other hand, if one of the video and photo modes is set at step ST51a, then the control section 171 carries out a process corresponding to the set mode (dynamic picture process or photograph process) at step ST55 or ST54.

Figure 32:
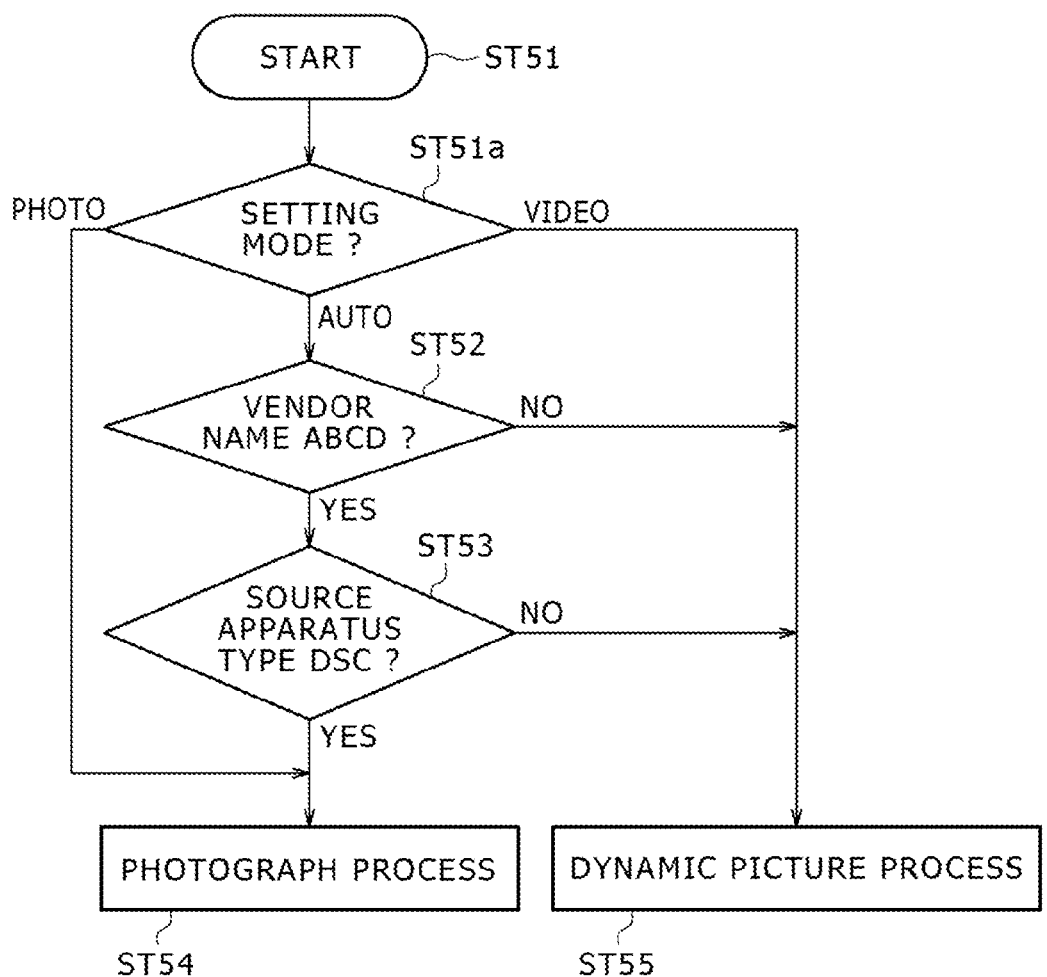
FIG. 32 is a flow chart illustrating another example of control on the reception side depending upon the content identification information.

In the example of the control process illustrated in the flow chart of FIG. 32, if the set mode is the auto mode, then an optimum process depending upon the type of the content is carried out for the received image data (image signal) similarly as in the example of the control process illustrated in the flow chart of FIG. 31. Further, in the example of the control process illustrated in the flow chart of FIG. 32, if the set mode is one of the video (dynamic picture) and photo (still picture) modes, then a process suitable for the set mode is carried out compulsorily for the received image data (image signal).

It is to be noted that, while, in the foregoing description, both of the vendor name region and the source apparatus type region of the SPI InfoFrame of the HDMI are used to transmit content identification information from a source apparatus to a sink apparatus, only the vendor name region or the source apparatus type region may be used or the model number region may be used additionally so that not only the content types of a video (dynamic picture) and a photo (still picture) but also the content types of a text, a cinema, a game and so forth can be identified.

Now, a further embodiment of the present invention is described.

Figure 34:
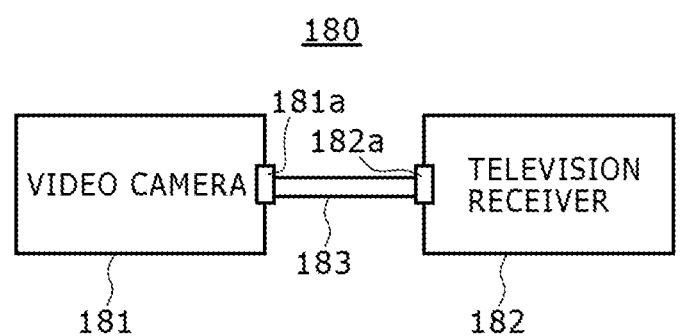
FIG. 34 is a block diagram showing an example of a configuration of an AV system as another embodiment.

FIG. 34 shows an example of a configuration of an AV system 180 to which the present invention is applied. Referring to FIG. 34, the AV system 180 is composed of a video camera 181 as a transmission apparatus, and a television receiver 182 as a reception apparatus. The video camera 181 and the television receiver 182 have USB terminals 181a and 182a and are connected to each other by a USB (Universal Serial Bus) cable 183.

In the present AV system 180, for example, an MPEG file is transmitted as a dynamic picture file and a JPEG file is transmitted as a still picture file from the video camera 181 to the television receiver 182.

When a file transmitted to the television receiver 182 is a JPEG file and a particular maker code is included in a tag of the JPEG file, the television receiver 182 carries out a photograph (Photograph) process for the received image data (image signal), but in any other case, the television receiver 182 carries out an ordinary dynamic picture process. Consequently, an optimum process suitable for the type of the content is carried out for the received image data (image signal). Here, the photograph (Photograph) process and the ordinary dynamic picture process are similar to those described hereinabove in connection with the AV system 140 shown in FIG. 12.

It is to be noted that the television receiver 182 may be configured such that it carries out a photograph (Photograph) process for the received image data (image signal) only from the fact that the file transmitted thereto is a JPEG file.

Further, the AV system 140 described hereinabove with reference to FIG. 12 may have such a modified configuration that it has a route along which an image signal of the baseband is transmitted from the video camera 141 to the television receiver 142 through the HDMI cable 143 and another route along which a compressed image signal is transmitted from the video camera 141 to the television receiver 142 through the USB cable 183 similarly as in the AV system 180 described hereinabove with reference to FIG. 34.

Further, while, in the AV system 180 shown in FIG. 34, the video camera 181 and the television receiver 182 have a USB terminal and are connected to each other by the USB cable 183, the video camera 181 and the television receiver 182 may have another terminal and be connected to each other.

Further, while, in the embodiment described above, the different apparatus are connected to each other by a cable, the present invention can naturally be applied similarly also to different apparatus which are connected to each other by radio.

INDUSTRIAL APPLICABILITY

The present invention can be applied to a communication system wherein an optimum process suitable for a type of a content for an image signal (image data) can be carried out on the reception side and which uses a communication interface such as, for example, the HDMI.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is
1. A transmission apparatus, comprising:
an identification information insertion section configured to insert, into a blanking period of an image signal of a predetermined content to be transmitted, content identification information for the identification of a type of the predetermined content;

a transmission section configured to transmit the image signal having the content identification information inserted in the blanking period thereof by said identification information insertion section in the form of differential signals through a plurality of channels, wherein the content identification information is formed from a plurality of data placed hierarchically; and a recording and reproduction section configured to reproduce and obtain the image signal of the predetermined content to be transmitted from reproduction of image data from an external apparatus recorded on a recording medium by the recording and reproduction section, and to supply the image data to the transmission section.

2. A transmission method comprising:

inserting, into a blanking period of an image signal of a predetermined content to be transmitted, content identification information for the identification of a type of the predetermined content;

transmitting, by a transmission section, the image signal having the content identification information inserted in the blanking period thereof in the form of differential signals through a plurality of channels, wherein the content identification information is formed from a plurality of data placed hierarchically; and reproducing and obtaining, by a recording and reproduction section, the image signal of the predetermined content to be transmitted from reproduction of image data from an apparatus, the apparatus external to the transmission section, recorded on a recording medium by the recording and reproduction section, and supplying the image data to the transmission section.

3. A transmission method, comprising:

inserting, into a blanking period of an image signal of a predetermined content to be transmitted, content identification information for the identification of a type of the predetermined content; and transmitting, by a transmission section, the image signal having the content identification information inserted in the blanking period thereof in the form of differential signals through a plurality of channels, wherein the content identification information is formed from a plurality of data placed hierarchically, and wherein the data is transmitted from an apparatus external to the transmission section.

4. A transmission method, comprising:

inserting, into a blanking period of an image signal of a predetermined content to be transmitted, content identification information for the identification of a type of the predetermined content;

transmitting the image signal having the content identification information inserted in the blanking period thereof in the form of differential signals through a plurality of channels, wherein the content identification information is formed from a plurality of data placed hierarchically; and displaying an image.

* * * * *